(12) United States Patent
Kita et al.

(10) Patent No.: US 10,990,314 B2
(45) Date of Patent: Apr. 27, 2021

(54) INFORMATION PROCESSING SYSTEM, INFORMATION PROCESSING METHOD, MANAGEMENT DEVICE, MANAGEMENT METHOD, COMMUNICATION DEVICE, COMMUNICATION METHOD, AND PROGRAM

(71) Applicant: SONY CORPORATION, Tokyo (JP)

(72) Inventors: Masato Kita, Kanagawa (JP); Takashi Suzuki, Kanagawa (JP); Katsuyuki Teruyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/510,724

(22) PCT Filed: Aug. 12, 2015

(86) PCT No.: PCT/JP2015/072881
§ 371 (c)(1),
(2) Date: Mar. 13, 2017

(87) PCT Pub. No.: WO2016/056303
PCT Pub. Date: Apr. 14, 2016

(65) Prior Publication Data
US 2017/0300267 A1  Oct. 19, 2017

(30) Foreign Application Priority Data

Oct. 10, 2014  (JP) .............................. JP2014-208691

(51) Int. Cl.
*G06F 3/06* (2006.01)
*G06K 19/077* (2006.01)

(52) U.S. Cl.
CPC ............ *G06F 3/0646* (2013.01); *G06F 3/061* (2013.01); *G06F 3/0683* (2013.01); *G06K 19/077* (2013.01)

(58) Field of Classification Search
CPC ....... G06F 3/0646; G06F 3/061; G06F 3/0683
See application file for complete search history.

(56) References Cited

U.S. PATENT DOCUMENTS

2007/0263596 A1* 11/2007 Charrat ................... H04L 45/00
370/351
2007/0278290 A1* 12/2007 Messerges ............. G06Q 20/10
235/380

(Continued)

FOREIGN PATENT DOCUMENTS

JP  2005-242444  9/2005
JP  2009-128942 A  6/2009

(Continued)

OTHER PUBLICATIONS

Nov. 2, 2018, European communication issued for related EP application No. 15849220.7.

(Continued)

*Primary Examiner* — Tim T Vo
*Assistant Examiner* — Harry Z Wang
(74) *Attorney, Agent, or Firm* — Paratus Law Group, PLLC

(57) ABSTRACT

There is provided an information processing system to increase a speed of returning identification information in response to a received command in the case where an identification information requesting command is received, the information processing system including: a plurality of processing devices each of which includes a storage unit configured to store an identification information piece; a management device configured to acquire the identification information piece from each of the plurality of the processing devices; and a communication device configured to communicate with an external device. The management device writes the identification information piece acquired from each of the plurality of the processing devices into the (Continued)

communication device. The communication device outputs a command received from the external device to one of the plurality of the processing devices on the basis of write orders of the identification information pieces written into the communication device by the management device.

20 Claims, 19 Drawing Sheets

(56) References Cited

U.S. PATENT DOCUMENTS

| | | | | |
|---|---|---|---|---|
| 2010/0190437 A1* | 7/2010 | Buhot | ............... | H04B 5/06 |
| | | | | 455/41.1 |
| 2011/0276961 A1* | 11/2011 | Johansson | ............... | H04W 4/80 |
| | | | | 717/178 |
| 2012/0265956 A1* | 10/2012 | Nakamichi | ............... | G06F 3/0605 |
| | | | | 711/162 |
| 2013/0052949 A1* | 2/2013 | Yang | ............... | H04W 4/80 |
| | | | | 455/41.1 |
| 2013/0203346 A1* | 8/2013 | Han | ............... | H04M 1/7253 |
| | | | | 455/41.1 |
| 2013/0205164 A1* | 8/2013 | Tanaka | ............... | H04L 47/822 |
| | | | | 714/5.1 |
| 2013/0331029 A1* | 12/2013 | Tang | ............... | H04W 4/60 |
| | | | | 455/41.1 |
| 2013/0336317 A1* | 12/2013 | Mithyantha | ............... | H04L 45/586 |
| | | | | 370/390 |
| 2014/0256252 A1* | 9/2014 | Geslin | ............... | H04B 5/0031 |
| | | | | 455/41.1 |

FOREIGN PATENT DOCUMENTS

| | | |
|---|---|---|
| JP | 2009-147845 | 7/2009 |
| JP | 2009-294821 | 12/2009 |
| JP | 2011-049778 | 3/2011 |
| JP | 2013-526734 A | 6/2013 |
| WO | WO 2013/179791 A1 | 12/2013 |

OTHER PUBLICATIONS

May 14, 2019, Japanese Office Action issued for related JP Application No. 2018-181614.

* cited by examiner

FIG. 6

| SE ON Request | SE No. |

FIG. 7

| SE ON Response | Status |

FIG. 8

| Polling Request | APPLICATION IDENTIFICATION INFORMATION PIECE | OPTION | TSN |

FIG. 9

| Polling Response | SECURE ELEMENT IDENTIFICATION INFORMATION PIECE | PAD | APPLICATION IDENTIFICATION INFORMATION PIECE |

| APPLICATION NAME | PRIORITY ORDER | APPLICATION IDENTIFICATION INFORMATION | SECURE ELEMENT IDENTIFICATION INFORMATION | CORRESPONDING SECURE ELEMENT INFORMATION |
|---|---|---|---|---|
| A1 | 1 | 1111 | SE-21 | SE-2 |
| A2 | 2 | 2222 | SE-22 | SE-2 |
| A3 | 3 | 3333 | SE-31 | SE-3 |
| A4 | 4 | 1111 | SE-11 | SE-1 |
| A5 | – | 5555 | SE-12 | SE-1 |

APPLICATION INFORMATION

| APPLICATION NAME | PRIORITY ORDER | APPLICATION IDENTIFICATION INFORMATION | SECURE ELEMENT IDENTIFICATION INFORMATION | CORRESPONDING SECURE ELEMENT INFORMATION |
|---|---|---|---|---|
| A1 | – | 1111 | SE-21 | SE-2 |
| A2 | 2 | 2222 | SE-22 | SE-2 |
| A3 | 3 | 3333 | SE-31 | SE-3 |
| A4 | 1 | 1111 | SE-11 | SE-1 |
| A5 | – | 5555 | SE-12 | SE-1 |

APPLICATION INFORMATION

INFORMATION PROCESSING SYSTEM, INFORMATION PROCESSING METHOD, MANAGEMENT DEVICE, MANAGEMENT METHOD, COMMUNICATION DEVICE, COMMUNICATION METHOD, AND PROGRAM

CROSS REFERENCE TO PRIOR APPLICATION

This application is a National Stage Patent Application of PCT International Patent Application No. PCT/JP2015/072881 (filed on Aug. 12, 2015) under 35 U.S.C. § 371, which claims priority to Japanese Patent Application No. 2014-208691 (filed on Oct. 10, 2014), which are all hereby incorporated by reference in their entirety.

TECHNICAL FIELD

The present disclosure relates to information processing systems, information processing methods, management devices, management methods, communication devices, communication methods, and programs.

BACKGROUND ART

In recent years, there are technologies for causing an information processing device and another device to communicate with each other (see Patent Literature 1). In such a technology, the information processing device includes a communication unit and a plurality of processing units, and the another information processing device specifies a processing unit of a communication partner from among the plurality of processing units. In this case, when the communication unit receives an identification information requesting command from the another information processing device, the communication unit returns respective identification information pieces acquired from the plurality of processing units to the another information processing device.

CITATION LIST

Patent Literature

Patent Literature 1: JP 2009-294821A

DISCLOSURE OF INVENTION

Technical Problem

However, in the case where the identification information requesting command is received, it is desirable to increase a speed of returning the identification information in response to the received command.

Solution to Problem

According to the present disclosure, there is provided an information processing system including: a plurality of processing devices each of which includes a storage unit configured to store an identification information piece; a management device configured to acquire the identification information piece from each of the plurality of the processing devices; and a communication device configured to communicate with an external device. The management device writes the identification information piece acquired from each of the plurality of the processing devices into the communication device. The communication device outputs a command received from the external device to one of the plurality of the processing devices on the basis of write orders of the identification information pieces written into the communication device by the management device.

In addition, according to the present disclosure, there is provided an information processing method including: acquiring an identification information piece from each of a plurality of processing devices; writing the identification information piece acquired from each of the plurality of the processing devices into a communication device; and outputting a command received from an external device to one of the plurality of the processing devices on the basis of write orders of the identification information pieces written into the communication device.

In addition, according to the present disclosure, there is provided a management device including: an identification information acquisition unit configured to acquire an identification information piece from each of a plurality of processing devices; and a write process unit configured to write the identification information piece acquired from each of the plurality of the processing devices into a communication device. A command received by the communication device is output to one of the plurality of the processing devices on the basis of write orders of the identification information pieces written into the communication device.

In addition, according to the present disclosure, there is provided a management method including: acquiring an identification information piece from each of a plurality of processing devices; and writing the identification information piece acquired from each of the plurality of the processing devices into a communication device. A command received by the communication device is output to one of the plurality of the processing devices on the basis of write orders of the identification information pieces written into the communication device.

In addition, according to the present disclosure, there is provided a program for causing a computer to function as a management device, the management device including: an identification information acquisition unit configured to acquire an identification information piece from each of a plurality of processing devices; and a write process unit configured to write the identification information piece acquired from each of the plurality of the processing devices into a communication device. A command received by the communication device is output to one of the plurality of the processing devices on the basis of write orders of the identification information pieces written into the communication device.

In addition, according to the present disclosure, there is provided a communication device including: a storage control unit configured to control a storage unit in a manner that a management device writes an identification information piece acquired by the management device from each of a plurality of processing devices; a command input accepting unit configured to accept input of a command; and a command output unit configured to output the command to one of the plurality of the processing devices on the basis of write orders of the identification information pieces written into the storage unit by the management device.

In addition, according to the present disclosure, there is provided a communication method including: controlling a storage unit in a manner that a management device writes an identification information piece acquired by the management device from each of a plurality of processing devices; accepting input of a command; and outputting the command to one of the plurality of the processing devices on the basis of write orders of the identification information pieces written into the storage unit by the management device.

In addition, according to the present disclosure, there is provided a program for causing a computer to function as a communication device, the communication device including: a storage control unit configured to control a storage unit in a manner that a management device writes an identification information piece acquired by the management device from each of a plurality of processing devices; a command input accepting unit configured to accept input of a command; and a command output unit configured to output the command to one of the plurality of the processing devices on the basis of write orders of the identification information pieces written into the storage unit by the management device.

Advantageous Effects of Invention

In the case where the identification information requesting command is received, it is possible to increase the speed of returning the identification information in response to the received command according to the present disclosure as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram illustrating a packet configuration of an SE ON request.

FIG. 7 is a diagram illustrating a packet configuration of an SE ON responses.

FIG. 8 is a diagram illustrating a packet configuration of a polling request.

FIG. 9 is a diagram illustrating a packet configuration of a polling response.

MODE(S) FOR CARRYING OUT THE INVENTION

Figure 1:
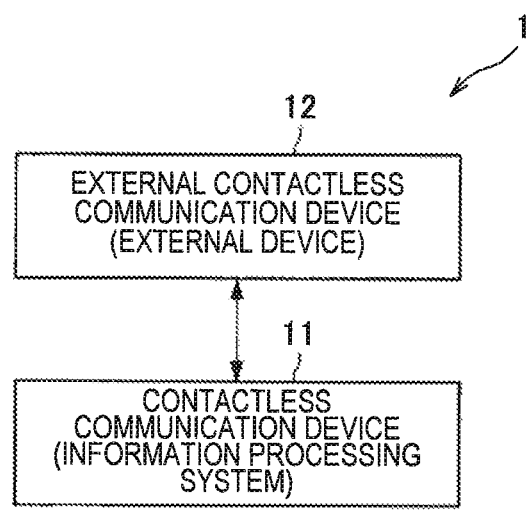
FIG. 1 is a diagram illustrating a configuration example of a communication system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description is given in the following order.
1. System configuration example
2. Configuration example of contactless communication device
3. Functional configuration example of front end
4. Functional configuration example of device host
5. Functional configuration example of external contactless communication device
6. Packet configurations of various commands
7. Identification information collecting operation
8. Priority order setting operation
9. Identification information writing operation
10. Command transfer operation
11. Workflow of operation of communication system
12. Workflow of operation of front end
13. Conclusion 1. System Configuration Example FIG. 1 is a diagram illustrating a configuration example of a communication system according to an embodiment of the present disclosure. As illustrated in FIG. 1, a communication system 1 includes an information processing system (hereinafter, also referred to as contactless communication device) 11 and an external device (hereinafter, also referred to as external contactless communication device) 12. The contactless communication device 11 and the external contactless communication device 12 mutually perform contactless communication. For example, the contactless communication device 11 and the external contactless communication device 12 perform contactless communication based on a specification of near-field communication (NFC).

The contactless communication device 11 may be implemented by an IC card, or may be implemented by a mobile phone device, for example. Also, the external contactless communication device 12 may be implemented by a reader/writer, and may be installed in a shop, a ticket gate for a conveyance, or the like. A user carrying the contactless communication device 11 passes the contactless communication device 11 over the external contactless communication device 12. This can cause the contactless communication device 11 to perform contactless communication with the external contactless communication device 12. According to such contactless communication, the external contactless communication device 12 can perform a predetermined process (for example, fee payment process) with regard to the contactless communication device 11.

2. Configuration Example of Contactless Communication Device

Figure 2:
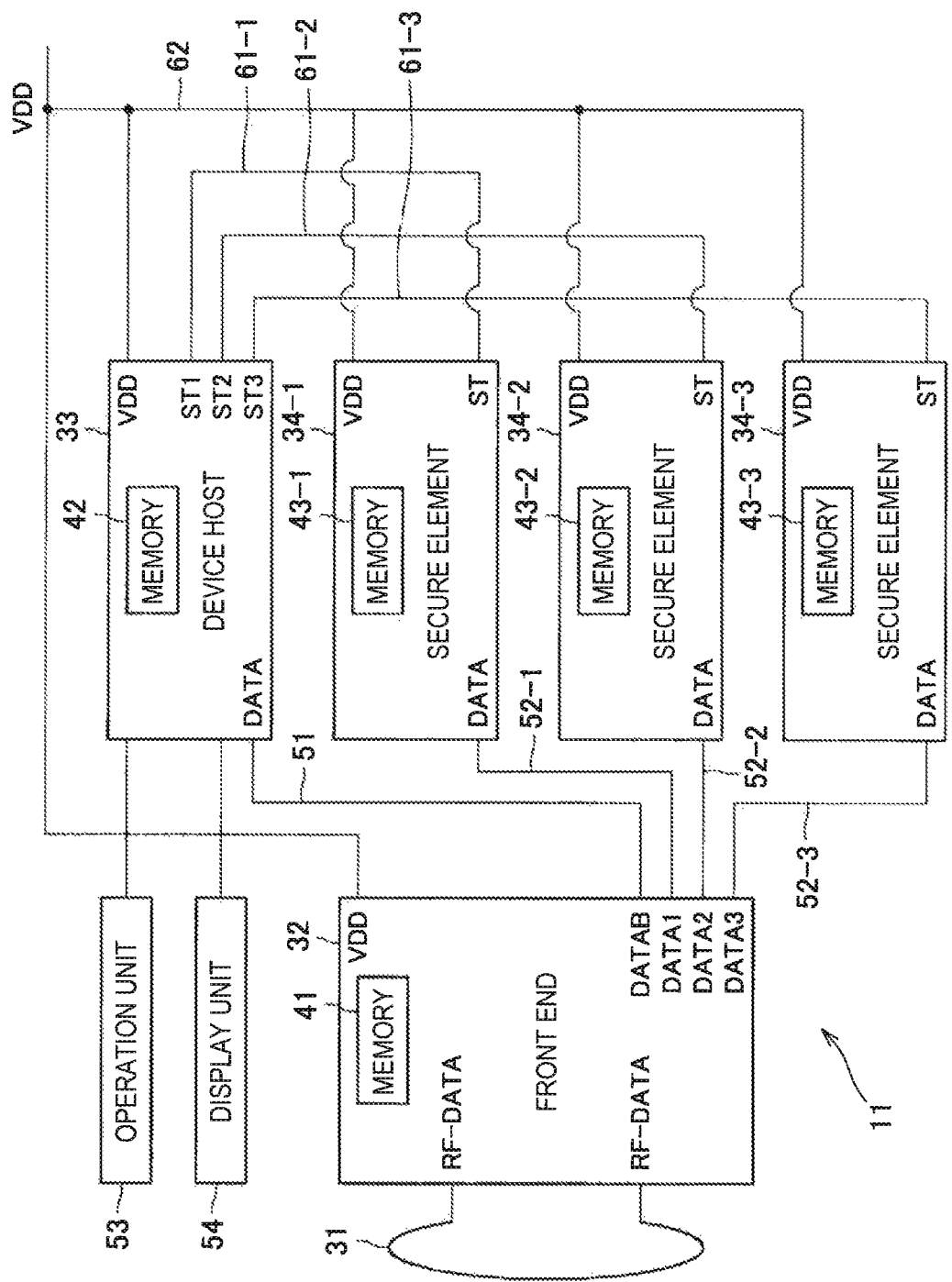
FIG. 2 is a diagram illustrating a configuration example of a contactless communication device.

Next, a configuration example of the contactless communication device 11 will be described. FIG. 2 is a diagram illustrating the configuration example of the contactless communication device 11. As illustrated in FIG. 2, the contactless communication device 11 includes an antenna 31, a communication unit or communication device (hereinafter, also referred to as front end (FE)) 32, a management unit or management device (hereinafter, also referred to as device host (DH)) 33, a processing units or processing devices (hereinafter, also referred to as secure elements (SEs)) 34-1 to 34-3, an operation unit 53, and a display unit 54. Hereinafter, the secure elements (SEs) 34-1 to 34-3 are simply referred to as "secure elements 34" in a case where it is not necessary to particularly distinguish the secure elements (SEs) 34-1 to 34-3. The same applies to other structural elements. In addition, the number of the secure elements 34 is not limited as long as the number of the secure elements 34 is two or more.

The antenna 31 exchanges electromagnetic waves with an antenna (not illustrated) of the external contactless communication device 12. The front end 32 exchanges signals with the external contactless communication device 12 via the antenna 31 connected with a terminal RF-DATA. A memory 41 of the front end 32 is a volatile or non-volatile memory. The memory 41 can store identification information as described later. Details of the identification information will be described later. In addition, the memory 41 stores a program to be executed by a processor of the front end 32.

A terminal DATAB of the front end 32 is connected with a terminal DATA of the device host 33 via a line 51. In a similar way, a terminal DATA1 of the front end 32 is connected with a terminal DATA of the secure element 34-1 via a line 52-1, a terminal DATA2 of the front end 32 is connected with a terminal DATA of the secure element 34-2 via a line 52-2, and a terminal DATA3 of the front end 32 is connected with a terminal DATA of the secure element 34-3 via a line 52-3.

The device host 33 collects identification information pieces from the respective secure elements 34-1 to 34-4 and outputs the identification information pieces to the front end 32. Thereby, the identification information pieces collected from the respective secure elements 34-1 to 34-4 are written into the memory 41 of the front end 32. Timings at which the identification information pieces are collected from the respective secure elements 34-1 to 34-4 may be a timing at which the contactless communication device 11 is powered on, or a timing at which any of the secure elements 34-1 to 34-4 is attached/detached. Alternatively, the timings may be a timing at which the device host requests the collection, or may be a timing at which a new application is installed.

A terminal ST1 of the device host 33 is connected with a terminal ST of the secure element 34-1 via a line 61-1, a terminal ST2 is connected with a terminal ST of the secure element 34-2 via a line 61-2, and a terminal ST3 is connected with a terminal ST of the secure element 34-3 via a line 61-3. This enables the device host 33 to check connection statuses of the respective secure elements 34-1 to 34-3 with the device host 33.

As described above, the terminals ST1, ST2, and ST3 of the device host 33 are connected with the terminals ST of the respective secure elements 34-1, 34-2, and 34-3 individually in a one-to-one manner. In addition, the terminals DATA1, DATA2, and DATA3 of the front end 32 are connected with the terminals DATA of the respective secure elements 34-1 to 34-3 individually in a one-to-one manner. Therefore, the terminals DATA1, DATA2, and DATA3 of the front end 32 correspond to the respective terminals ST1, ST2, and ST3 of the device host 33 individually in a one-to-one manner. In addition, the memory 42 stores a program to be executed by a processor of the device host 33.

The secure element 34-1 includes a memory 43-1 that stores an identification information piece. The memory 43-1 may be a non-volatile memory. In addition, the secure element 34-1 stores an application, and performs a process in response to a request from the external contactless communication device 12 (process based on application). As the identification information piece, the memory 43-1 stores an identification information piece (ID1) of the secure element 34-1 and an application identification information piece (SC1). In addition, the memory 43-1 stores a program or an application to be executed by a processor of the secure element 34-1.

In a similar way, the secure element 34-2 includes memory 43-2 that stores an identification information piece. The memory 43-2 may be a non-volatile memory. In addition, the secure element 34-2 stores an application, and performs a process in response to a request from the external contactless communication device 12 (process based on application). As the identification information piece, the memory 43-2 stores an identification information piece (ID2) of the secure element 34-2 and an application identification information piece (SC2). In addition, the memory 43-2 stores a program or an application to be executed by a processor of the secure element 34-2.

The secure element 34-3 includes a memory 43-3 that stores an identification information piece. The memory 43-3 may be a non-volatile memory. In addition, the secure element 34-3 stores an application, and performs a process in response to a request from the external contactless communication device 12 (process based on application). As the identification information piece, the memory 43-3 stores an identification information piece (ID3) of the secure element 34-3 and an application identification information piece (SC3). In addition, the memory 43-3 stores a program or an application to be executed by a processor of the secure element 34-3.

Via a line 62, electric power is supplied to respective terminals VDD of the front end 32, the device host 33, and the secure elements 34-1 to 34-3. The device host 33 and the secure element 34-1 to 34-3 have an activation function and deactivation function. For example, as specified in Near Field Communication Wired Interface (NFC-WI) (ISO/IEC28361), the device host 33 and the secure elements 34-1 to 34-3 are activated when a pulse is input to the terminals DATA in a state where electric power is supplied to the terminals VDD. On the other hand, the device host 33 and the secure elements 34-1 to 34-3 are deactivated when a pulse is not input to the terminals DATA in a state where electric power is supplied to the terminals VDD.

The operation unit 53 has a function of accepting operation from a user. For example, the operation unit 53 may be an input device operated by a user such as a mouse, a keyboard, a touchscreen, a button, a switch, or a lever, or may be a microphone capable of detecting voice of a user. The display unit 54 is implemented by a device that can visually or aurally issue a notification to a user. For example, the display unit 54 may be a liquid crystal display (LCD), an organic electro-luminescence display, or a sound output device such as a speaker or headphones.

3. Functional Configuration Example of Front End

Figure 3:
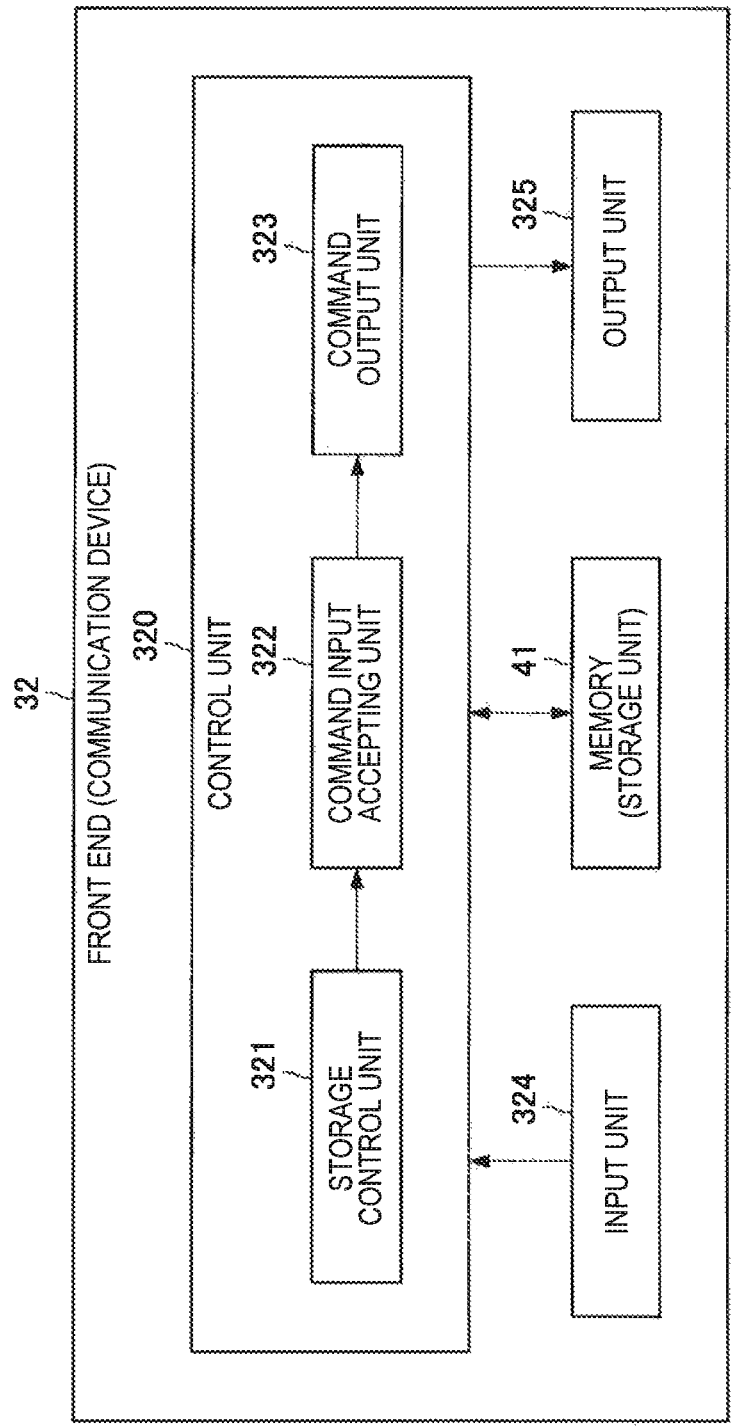
FIG. 3 is a diagram illustrating a functional configuration example of a front end.

Next, a functional configuration example of the front end 32 will be described. FIG. 3 is a diagram illustrating the functional configuration example of the front end 32. As illustrated in FIG. 3, the front end 32 includes a control unit 320, an input unit 324, the memory (storage unit) 41, and an output unit 325. The control unit 320 is implemented by a processor such as a central processing unit (CPU). Functions of the control unit 320 are achieved by the processor executing the program stored in the memory 41. The control unit 320 includes a storage control unit 321, a command input accepting unit 322, a command output unit 323, and the like. Such structural elements of the control unit 320 will be described later.

The input unit 324 has a function of accepting input signals. For example, the input unit 324 corresponds to the terminal ST, the terminal DATA, the terminal RF-DATA, and the terminal VDD in the above described example. The output unit 325 has a function of outputting signals. For example, the output unit 325 corresponds to the terminal ST, the terminal DATA, and the terminal RF-DATA in the above described example. The functional configuration example of the front end 32 has been described above.

4. Functional Configuration Example of Device Host

Figure 4:
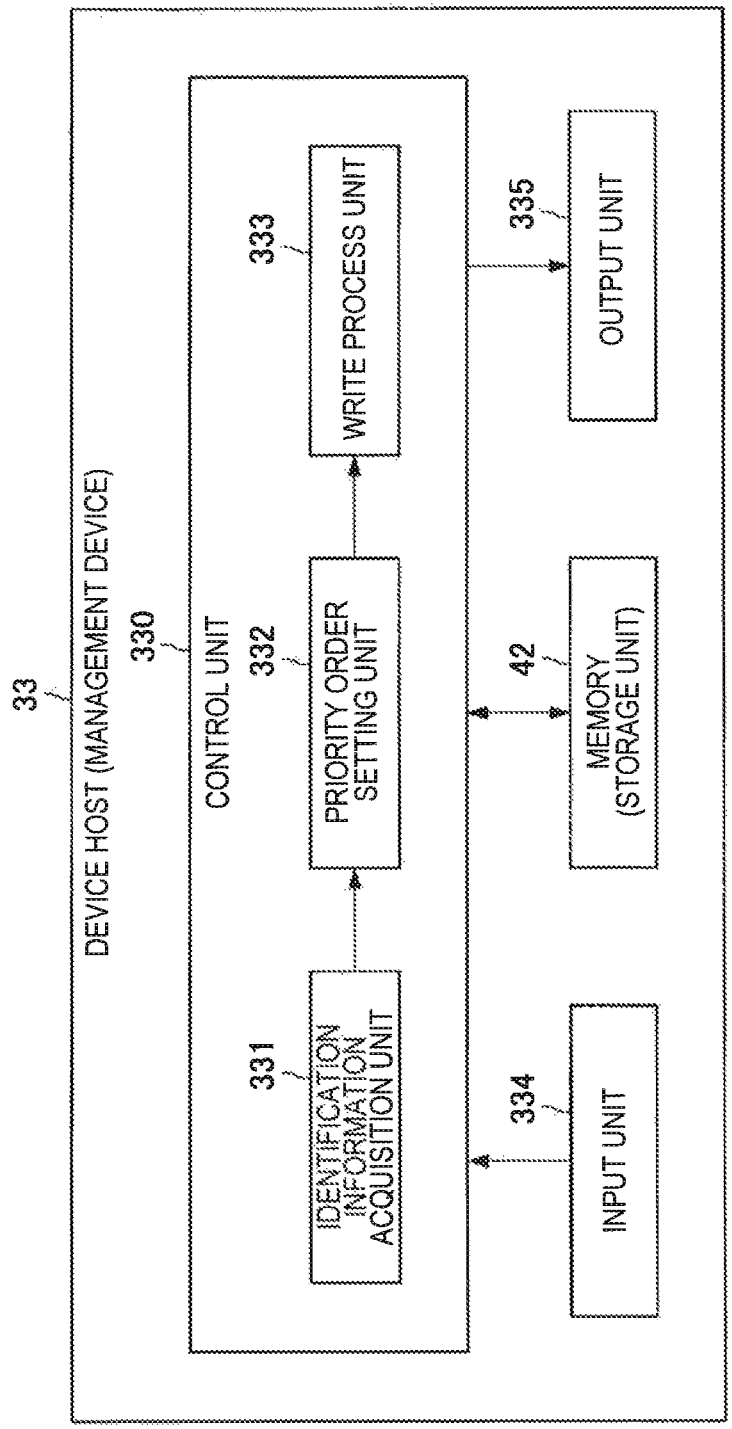
FIG. 4 is a diagram illustrating a functional configuration example of a device host.

Next, a functional configuration example of the device host 33 will be described. FIG. 4 is a diagram illustrating the functional configuration example of the device host 33. As illustrated in FIG. 4, the device host 33 includes a control unit 330, an input unit 334, the memory (storage unit) 42, and an output unit 335. The control unit 330 is implemented by a processor such as a CPU. Functions of the control unit 330 are achieved by the processor executing the program stored in the memory 42. The control unit 330 includes an identification information acquisition unit 331, a priority order setting unit 332, a write process unit 333, and the like. Such structural elements of the control unit 330 will be described later.

The input unit 334 has a function of accepting input signals. For example, the input unit 334 corresponds to the terminals ST1, ST2, and ST3, the terminal DATA, the terminal VDD, and a connection terminal with the operation unit 53 in the above described example. The output unit 335 has a function of outputting signals. For example, the output unit 335 corresponds to the terminals ST1, ST2, and ST3, the terminal DATA, and a connection terminal with the display unit 54 in the above described example. The functional configuration example of the device host 33 has been described above.

Figure 5:
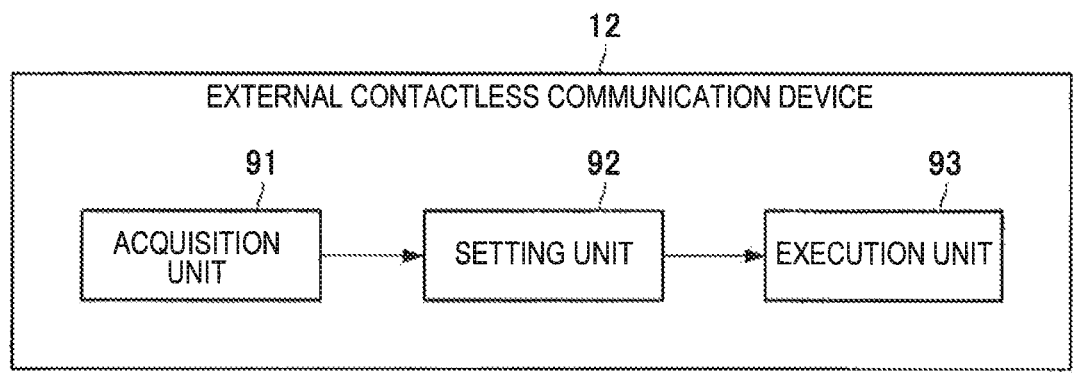
FIG. 5 is a diagram illustrating a configuration example of an external contactless communication device.

5. Functional Configuration Example of External Contactless Communication Device Next, a functional configuration example of the external contactless communication device 12 will be described. FIG. 5 is a diagram illustrating the functional configuration example of the external contactless communication device 12. As illustrated in FIG. 5, the external contactless communication device 12 includes an acquisition unit 91, a setting unit 92, and an execution unit 93. The acquisition unit 91 acquires an identification information piece stored in the memory 41 of one of the secure elements 34-1 to 34-3 in the contactless communication device 11, via the front end 32 from the contactless communication device 11.

Among dedicated communication lines between the front end 32 and the secure elements 34-1 to 34-3, the setting unit 92 sets a communication line of the secure element 34 corresponding to the one identification information piece acquired by the acquisition unit 91. The execution unit 93 causes the secure element 34 corresponding to the one identification information piece acquired by the acquisition unit 91, to execute a predetermined process (process based on application stored in a memory 41).

6. Packet Configurations of Various Commands

Figure 6:
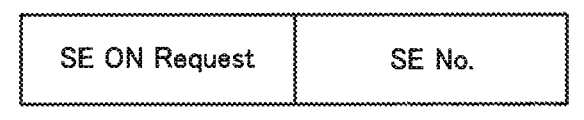
Figure 7:
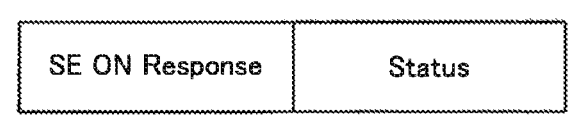

Next, with reference to FIG. 6 to FIG. 9, packet configurations of various commands used in the communication system 1 will be described. FIG. 6 illustrates a packet configuration of an SE ON request. As illustrated in FIG. 6, SE No. is attached to the SE ON request. The SE No. indicates a number of the terminal DATA1, DATA2, or DATA3 of the front end 32. FIG. 7 illustrates a packet configuration of an SE ON responses. As illustrated in FIG. 7, Status is attached to the SE ON response. The Status indicates a status.

When the SE ON request is received, the front end 32 sets a line of a designated terminal among the lines 52-1 to 52-3 of the terminals DATA1, DATA2, and DATA3 (that is, communication line with designated secure element 34), and returns the SE ON response in which such a setting status is written. The secure element 34 is set to the deactivation state in a case where the corresponding communication line is not set. On the other hand, the secure element 34 is set to the activation state in a case where the communication line is set.

FIG. 8 illustrates a packet configuration of a polling request. As illustrated in FIG. 8, the application identification information piece, an option, and a TSN are attached to the polling request. In a case where the contactless communication device 11 receives the polling request from the external contactless communication device 12, the secure element 34 having the memory 43 in which the application identification information piece attached to the polling request is stored returns a polling response via the front end 32.

For example, in the TSN, one of time slot numbers from 0 to 15 is written. The front end 32 receives the polling response from the secure element 34, and returns a response at a timing of a time slot number less than or equal to a value written in the TSN. For example, in a case where the maximum value (15) of the time slot number is written in the TSN, the front end 32 receives the response from the secure element 34, and returns the response at a timing of a time slot number of any value among 0 to 15. The option is used as necessary.

FIG. 9 illustrates a packet configuration of a polling response. As illustrated in FIG. 9, the secure element identification information piece, a PAD, and the application identification information piece are attached to the polling response. The PAD is padded with predetermined data. In the following description, both the secure element identification information piece and the application identification information piece are referred to as the identification information piece. As the identification information piece, it is only necessary to use at least one of the secure element identification information piece and the application identification information piece. The secure element identification information piece may be an ID that is recorded at the time of manufacturing the secure element 34 and normally not rewritable, or a unique ID that is numbered by a business operator in their original way. The application identification information piece may be an ID given for uniquely identifying an application.

7. Identification Information Collecting Operation

Next, an operation example in which the device host 33 collects an identification information piece from each of the secure elements 34-1 to 34-3 will be described. Such operation may be performed in a case of powering on the contactless communication device 11. Alternatively, in a case of attaching or detaching the secure element 34, the device host 33 may collect the identification information piece from the attached/detached secure element 34. Alternatively, such operation may be performed when the device host 33 requests the identification information piece from the secure element 34 or when a new application is installed in the secure element 34. Hereinafter, an example will be described in which the device host 33 collects an identification information piece from the attached/detached secure element 34-1 in the case of attaching/detaching the secure element 34-1.

First, the device host 33 checks the status of the terminal ST1 to detect whether the secure element 34-1 is newly connected with the terminal ST1. Next, the device host 33 outputs the SE ON request (SE1) to the front end 32 in a case where it has been detected that the secure element 34-1 has been newly connected with the terminal ST1.

When the front end 32 receives the SE ON request (SE1), the front end 32 switches the communication line to the secure element 34-1 (SE1). In other words, the front end 32 enables only the communication line of the line 52-1 among the lines 52-1 to 52-3. Specifically, only the secure element 34-1 is activated, and the other secure elements 34-2 and 34-3 are still in the deactivation state. As a result, this can suppress wasteful electric power consumption in comparison with a case where all the secure elements are always in the activation state. Next, the front end 32 returns the SE ON response to the device host 33.

By receiving the SE ON response, the device host 33 can recognize that the communication line has been switched to the communication line for the secure element 34-1. Here, the device host 33 outputs the polling request. The front end 32 receives the polling request via the terminal DATAB, and transfers the polling request to the secure element 34-1 via the line 52-1 that is the already set communication line.

The secure element 34-1 receives the polling request, and reads the application identification information piece SC1 and the secure element identification information piece ID1 as the identification information piece stored in the memory 43-1. Subsequently, the secure element 34-1 returns the polling response to which the read secure element identification information piece ID1 and the read application identification information piece SC1 are attached, to the front end 32.

The front end 32 receives the polling response, and transfers the polling response to the device host 33. At this time, the front end 32 sets the secure element 34-1 to the deactivation state. This can reduce electric power consumption. The device host 33 receives the polling response. Thereby, the identification information acquisition unit 331 of the device host 33 can collect the identification information piece (combination of application identification information piece and secure element identification information piece) from the secure element 34-1 connected with the terminal ST1 (connected with terminal DATA1 of device host 33).

In a similar way, the identification information acquisition unit 331 can also collect a combination of an application identification information piece and a secure element identification information piece from each of the secure elements 34-2 and 34-3.

8. Priority Order Setting Operation

Next, with reference to FIG. 10 to FIG. 13, an operation example for setting priority orders of the combinations of the application identification information pieces and the secure element identification information pieces collected by the identification information acquisition unit 331 will be described. FIG. 10 to FIG. 13 are each a diagram illustrating operation for setting priority orders of combinations of application identification information pieces and secure element identification information pieces. In FIG. 10 to FIG. 13, corresponding secure element information pieces are information unique to the respective secure elements 34.

Figure 10:
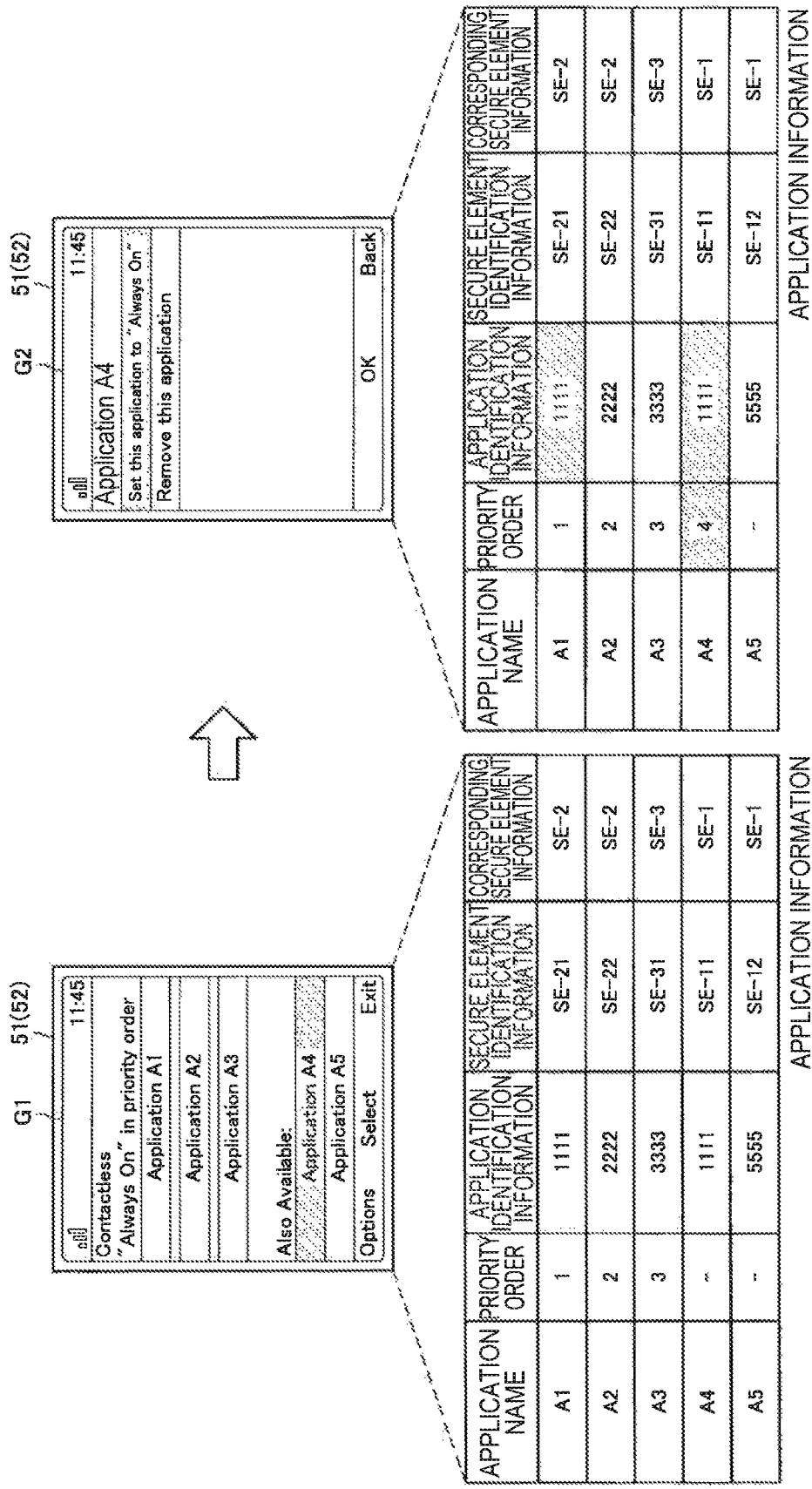
FIG. 10 is a diagram illustrating operation for setting priority orders to combinations of application identification information pieces and secure element identification information pieces.

As illustrated in FIG. 10, the priority order setting unit 332 has already set a priority order "1" for a combination of an application identification information piece "1111" and a secure element identification information piece "SE-21", a priority order "2" for a combination of an application identification information piece "2222" and a secure element identification information piece "SE-22", and a priority order "3" for a combination of an application identification information piece "3333" and a secure element identification information piece "SE-31". Here, the priority order with a smaller value has a higher priority order. However, the relation between the value of the priority order and the degree of the priority is not specifically limited.

On the other hand, the priority order setting unit 332 has not set the priority orders for a combination of the application identification information piece "1111" and a secure element identification information piece "SE-11", or for a combination of an application identification information piece "5555" and a secure element identification information piece "SE-12". In this case, the priority order setting unit 332 can cause the display unit 54 to display a priority order setting screen G1. The priority order setting screen G1 displays an "application A1" to an "application A3" in an application name column of available applications in descending order of priority. The priority order setting screen G1 also displays an "application A4" and an "application A5" in an application name column of applications to be available.

For example, it is assumed that the operation unit 53 has detected operation for selecting the "application A4". In this case, the priority order setting unit 332 can cause the display unit 54 to display an application setting screen G2. As illustrated in FIG. 10, in the application setting screen G2, it is possible to select whether to set the "application A4" to available or to remove the "application A4". However, in a case where the "application A4" is set to available, the same applications (application identification information pieces "1111") stored in secure elements 34 that are different from each other (SE-21 and SE-11) are set to available.

Figure 11:
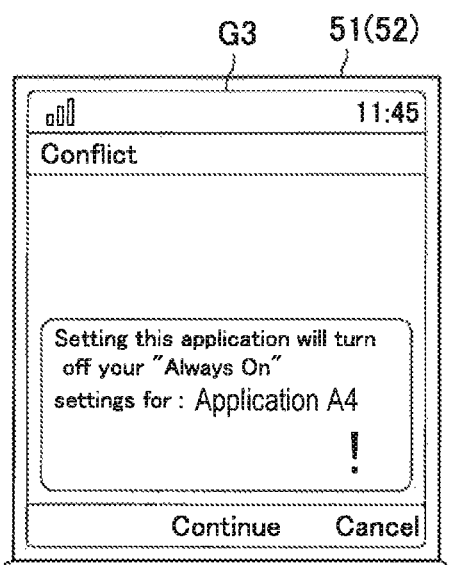
FIG. 11 is a diagram illustrating operation for setting priority orders to combinations of application identification information pieces and secure element identification information pieces.
Figure 12:
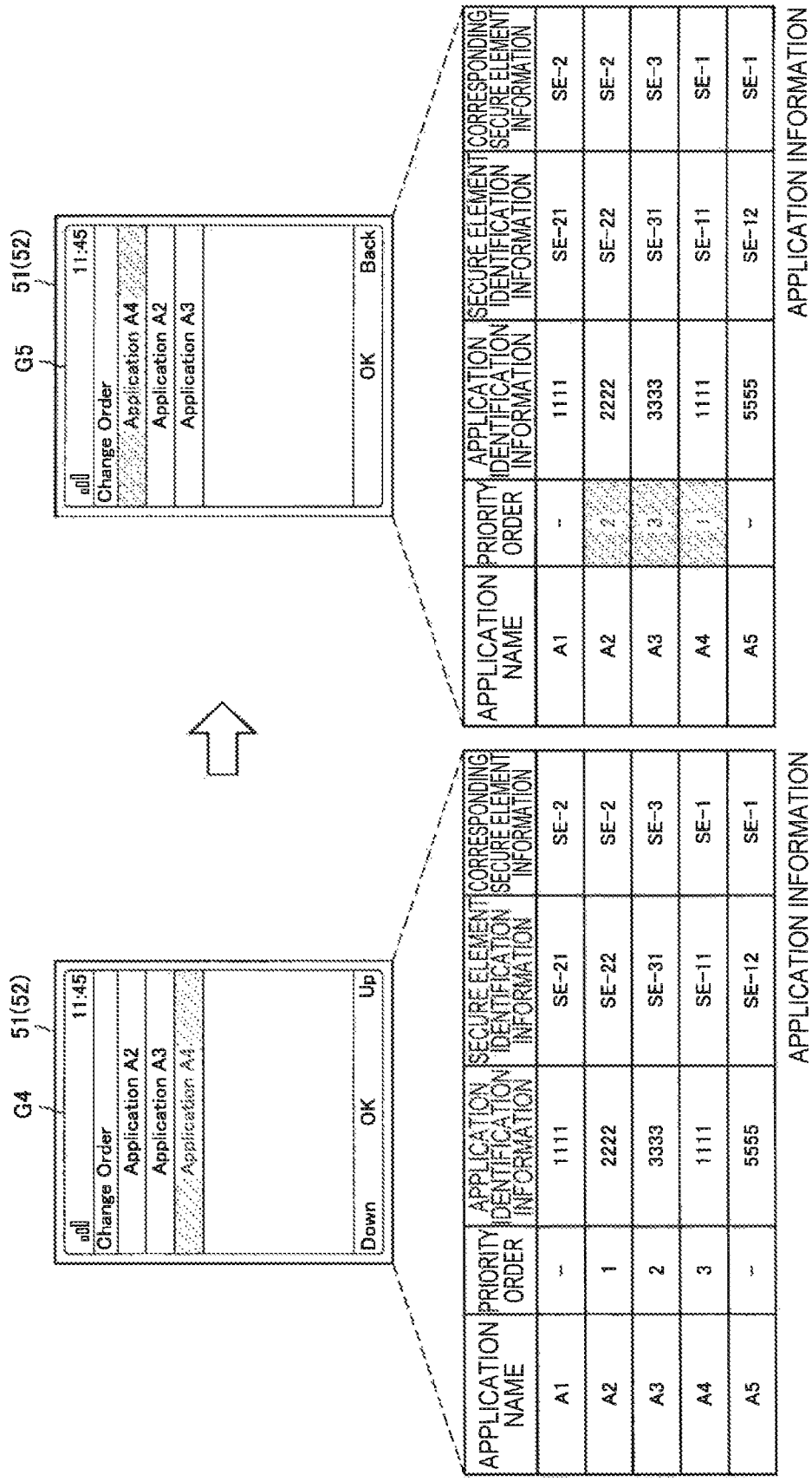
FIG. 12 is a diagram illustrating operation for setting priority orders to combinations of application identification information pieces and secure element identification information pieces.
Figure 13:
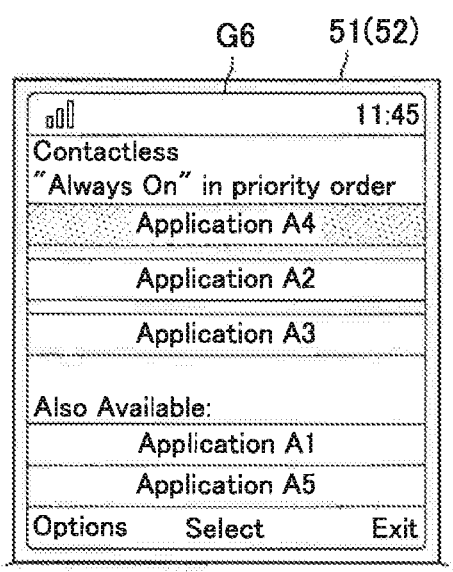
FIG. 13 is a diagram illustrating operation for setting priority orders to combinations of application identification information pieces and secure element identification information pieces.

Therefore, as illustrated in FIG. 11, it is preferable that the priority order setting unit 332 cause the display unit 54 to display a screen (conflict notification screen) G3 to notify that the same applications are set to available (hereinafter, also referred to as "conflict") in a case where the operation unit 53 has detected the operation for setting the "application A4" to available. Subsequently, as illustrated in FIG. 12, the priority order setting unit 332 may set the "application A1" to unavailable and may set the "application A4" to available. Next, the priority order setting unit 332 may cause the display unit 54 to display a priority order changing screen G3 for changing the respective priority orders of the available "application A2" to "application A4".

In a case where the operation unit 53 has detected operation for selecting the "application A4", the "application A2", and the "application A3" in descending order of priority in the priority order changing screen G4, the priority order setting unit 332 resets the priority order "1" for the combination of the application identification information piece "1111" and the secure element identification information piece "SE-11", the priority order "2" for the combination of the application identification information piece "2222" and the secure element identification information piece "SE-22", and the priority order "3" for the combination of the application identification information piece "3333" and the secure element identification information piece "SE-31".

When the priority orders have been changed, the priority order setting unit 332 may cause the display unit 54 to display a priority order changing screen G5, and may cause the display unit 54 to display a priority order setting screen G6. In the above described example, the priority orders are changed when the conflict occurs. However, the timing of changing the priority orders is not limited to the timing when the conflict occurs. For example, the priority order setting unit 332 may cause the priority order changing screen G4 to be displayed to allow the priority orders to be changed when the operation unit 53 has detected the operation for changing the priority order. Alternatively, the priority order setting unit 332 may cause the priority order changing screen G4 to be displayed to allow the priority orders to be changed when a combination of an application identification information piece and a secure element identification information piece is newly detected.

9. Identification Information Writing Operation

Figure 14:
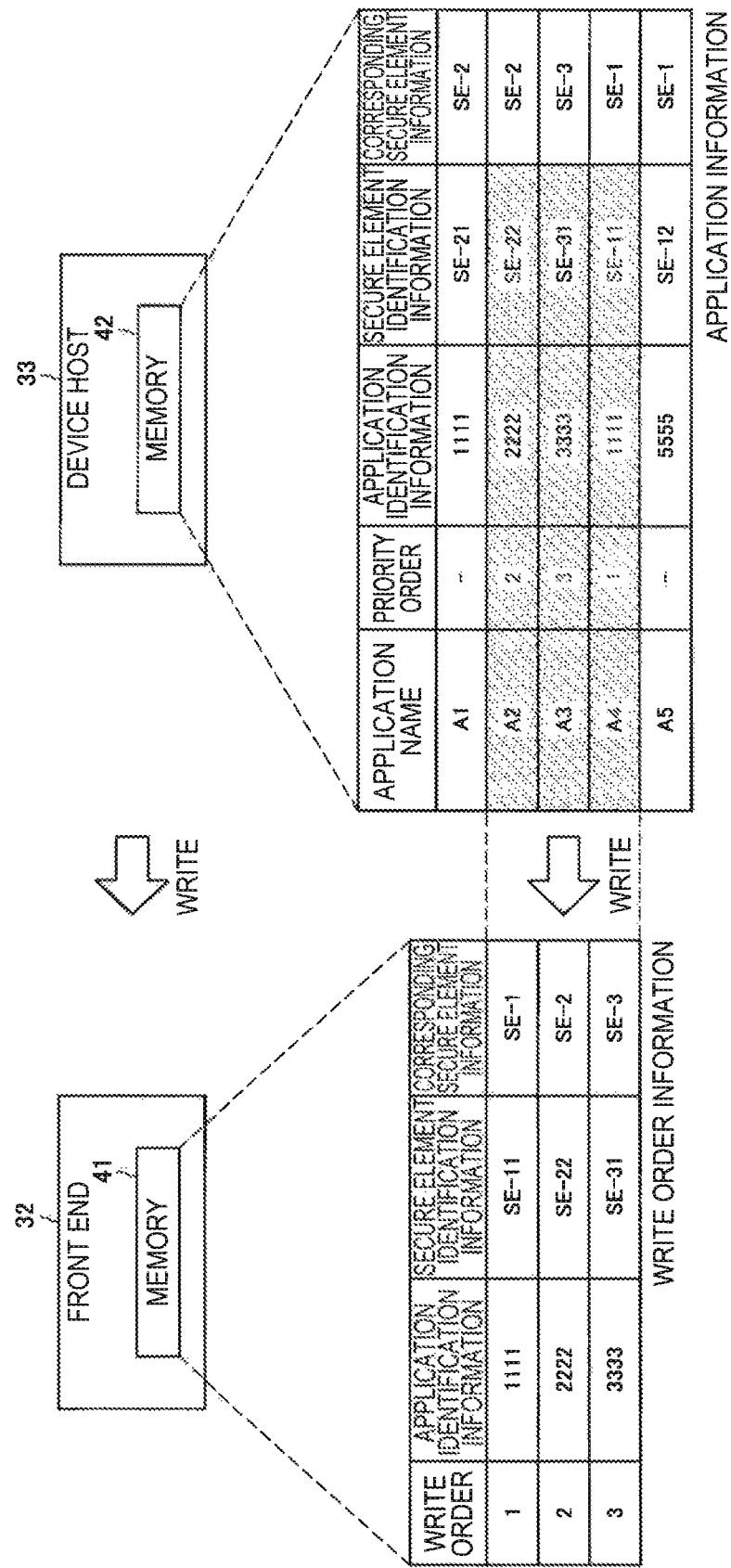
FIG. 14 is a diagram illustrating operation for writing combinations of application identification information pieces and secure element identification information pieces into a memory of a front end.

Next, with reference to FIG. 14, an operation example will be described in which combinations of application identification information pieces, secure element identification information pieces, and corresponding secure element information pieces are written into the memory 41 of the front end 32 in accordance with priority orders set by the priority order setting unit 332. FIG. 14 is a diagram illustrating operation for writing the combinations of application identification information pieces, the secure element identification information pieces, and the corresponding secure element information pieces into the memory 41 of the front end 32. The write process unit 333 writes the combinations of the application identification information pieces and the secure element identification information pieces into the memory 41 of the front end 32 in accordance with the priority orders.

As a result, as illustrated in FIG. 14, the combination of the application identification information piece, the secure element identification information piece, and the corresponding secure element information piece to which the priority order "1" has been set is written into the memory 41 of the front end 32 in a write order "1". In addition, the combination of the application identification information piece, the secure element identification information piece, and the corresponding secure element information piece to which the priority order "2" has been set is written into the memory 41 of the front end 32 in a write order "2". In addition, the combination of the application identification information piece, the secure element identification information piece, and the corresponding secure element information piece to which the priority order "3" has been set is written into the memory 41 of the front end 32 in a write order "3".

At this time, the storage control unit 321 of the front end 32 controls the memory 41 so that the write process unit 333 writes the combinations of the application identification information pieces, the secure element identification information pieces, and the corresponding secure element information pieces into the memory 41. Here, the example has been described above in which the write process unit 333 writes the combinations of the application identification information pieces, the secure element identification information pieces, and the corresponding secure element information pieces into the memory 41 of the front end 32 in accordance with the priority orders. However, it is also possible for the write process unit 333 to write the combinations of the application identification information pieces, the secure element identification information pieces, and the corresponding secure element information pieces into the memory 41 of the front end 32 in accordance with information other than the priority orders.

10. Command Transfer Operation

Next, with reference to FIG. 15 to FIG. 17, a method for deciding a transfer destination of a polling request in the contactless communication device 11 in a case where the external contactless communication device 12 has transmitted the polling request to the contactless communication device 11 will be described. Here, the polling request is used as an example of a command. However, it is also possible to use commands other than the polling request.

Figure 15:
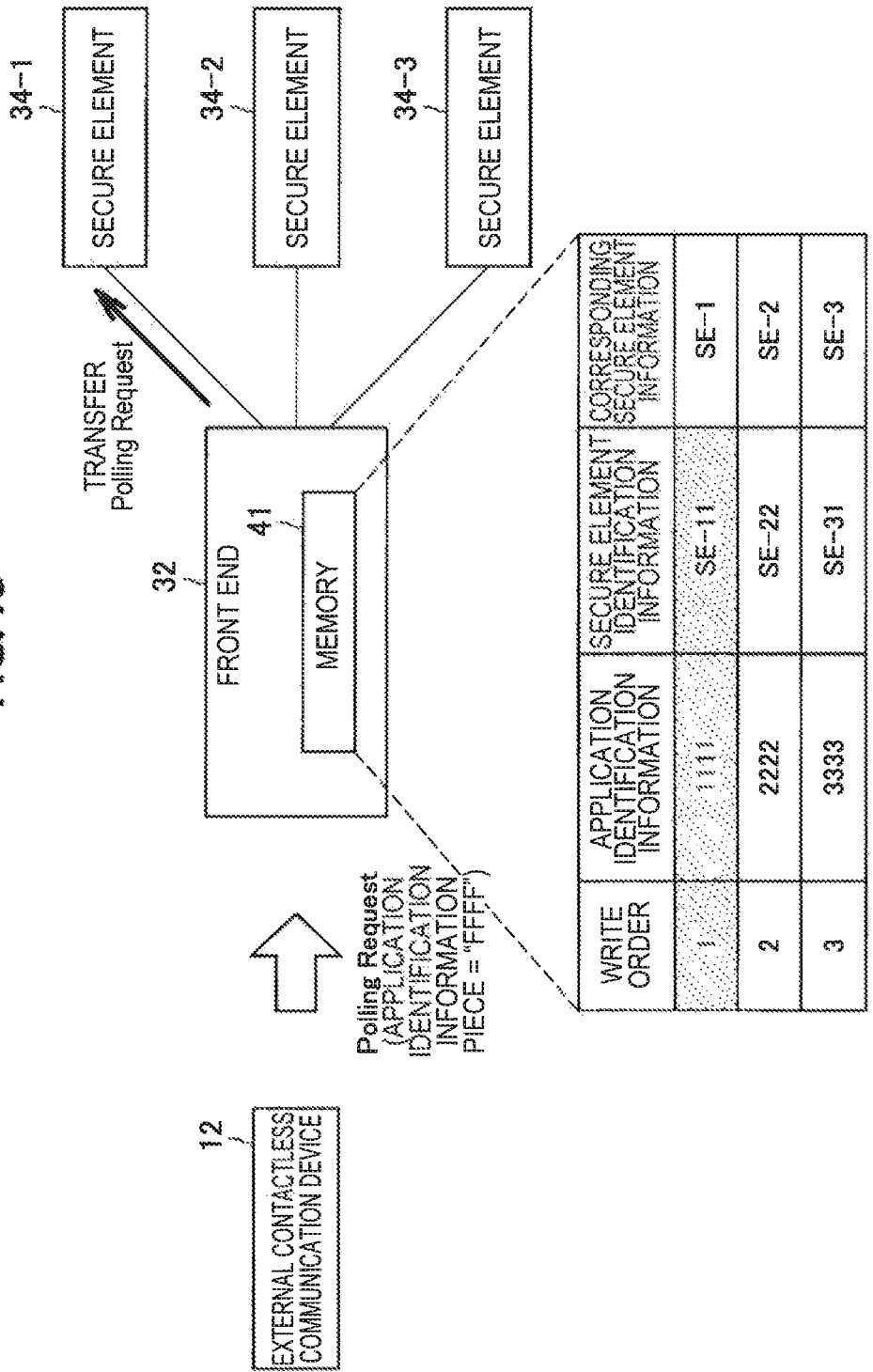
FIG. 15 is a diagram illustrating a transfer destination of a polling request received from an external contactless communication device.
Figure 16:
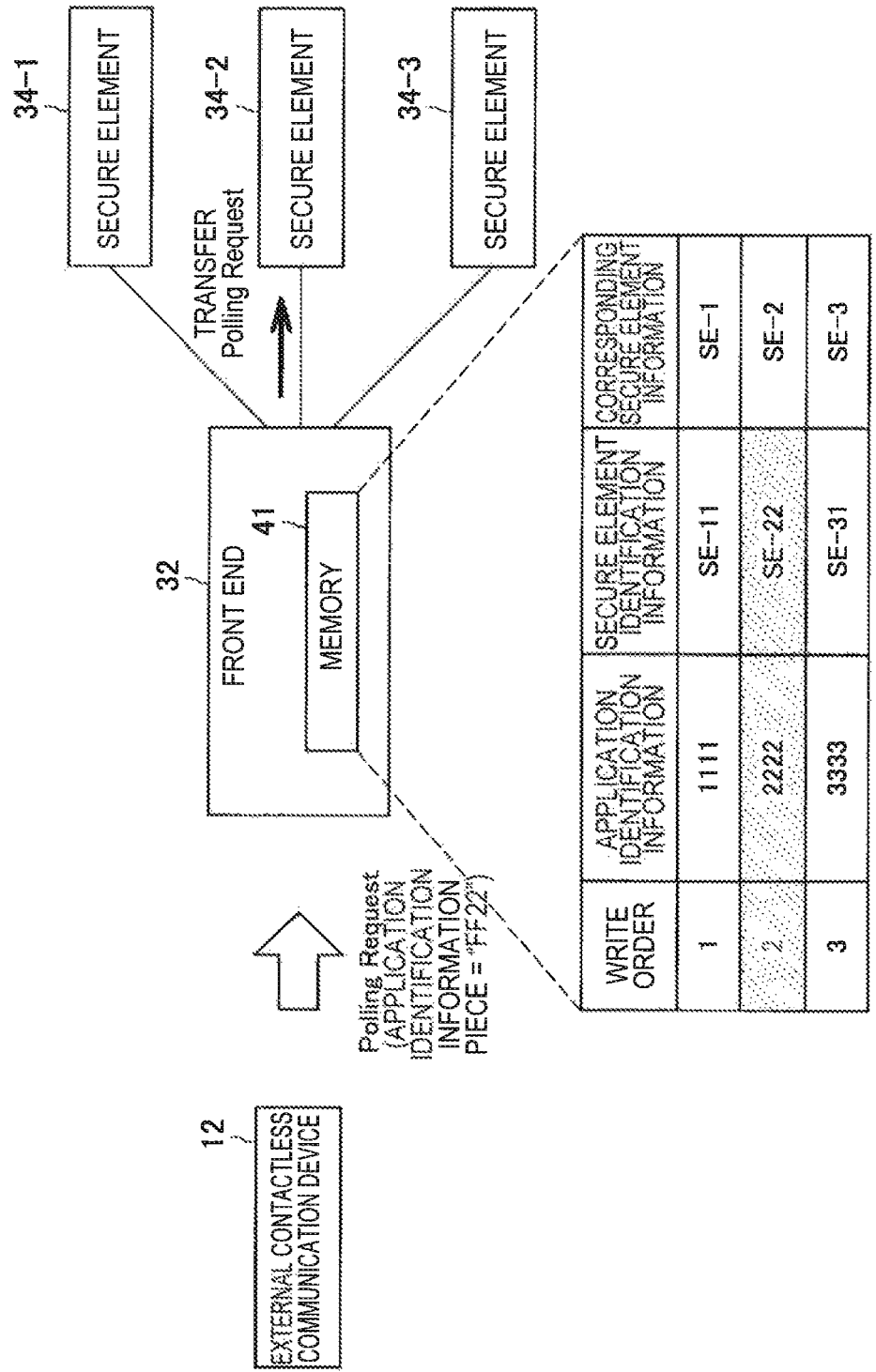
FIG. 16 is a diagram illustrating a transfer destination of a polling request received from an external contactless communication device.
Figure 17:
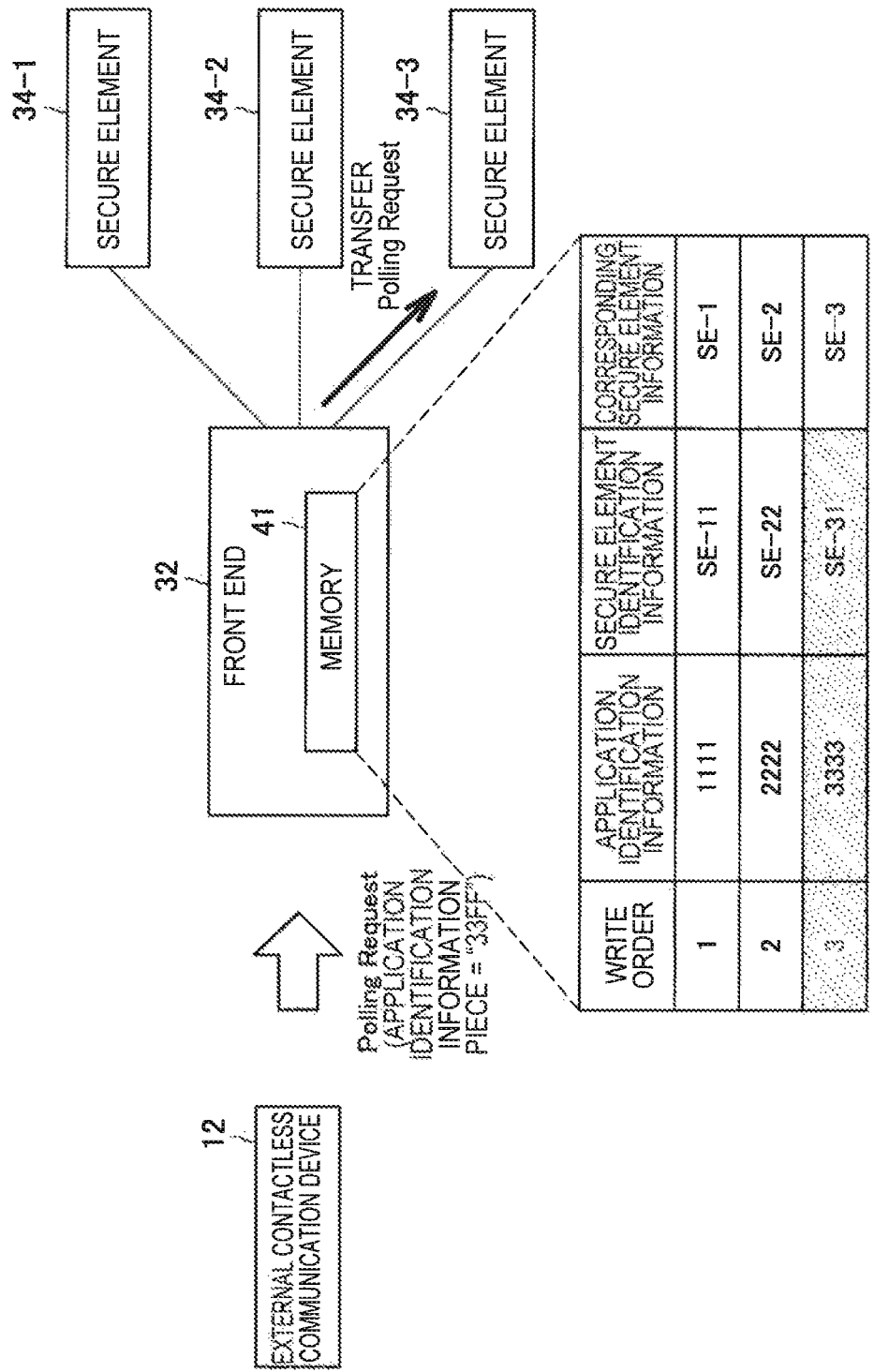
FIG. 17 is a diagram illustrating a transfer destination of a polling request received from an external contactless communication device.

FIG. 15 to FIG. 17 are each a diagram illustrating a transfer destination (output destination) of a polling request received from the external contactless communication device 12. The polling request is transmitted by the external contactless communication device 12, received by the antenna 31 of the front end 32, and accepted by the command input accepting unit 322. Subsequently, the command output unit 323 transfers (outputs) the polling request to one of the secure elements 34-1 to 34-3 on the basis of write orders of the identification information pieces (application identification information pieces and secure element identification information pieces) written by the device host 33 into the front end 32.

More specifically, the command output unit 323 selects one identification information piece (application identification information piece and secure element identification information piece) from identification information pieces acquired from the respective secure elements 34-1 to 34-3 on the basis of their write orders, and transfers the polling request to the secure element 34 that has the memory 43 in which the selected identification information piece is stored. For example, it is only necessary for the command output unit 323 to acquire predetermined information set in the polling request, and select one identification information piece on the basis of the predetermined information and the write order. Here, the application identification information piece is used as the predetermined information set in the polling request. However, other information (such as secure element identification information piece) may be used.

For example, as illustrated in FIG. 15, it is assumed that the application identification information piece set in the polling request is "FFFFh". Here, "F" is a value indicating that a corresponding digit is any value for the external contactless communication device 12. At this time, the application identification information piece "FFFFh" set in the polling request may correspond to information used by the external contactless communication device 12 for designating any application identification information piece for the external contactless communication device 12.

Therefore, it is only necessary for the command output unit 323 to select a combination of the application identification information piece "1111h" and the corresponding secure element identification information piece "SE-11" with earliest write order as the one identification information piece. Subsequently, as illustrated in FIG. 15, it is only necessary for the command output unit 323 to transfer the polling request to the secure element 34-1 identified by the corresponding secure element information piece "SE-1" associated with the combination of the application identification information piece "1111h" and the secure element identification information piece "SE-1".

Alternatively, for example, as illustrated in FIG. 16, it is assumed that the application information piece set in the polling request is "FF22h". Here, "0" to "E" are values used by the external contactless communication device 12 for specifying a corresponding digit as a value from "0" to "E". In this situation, the application information piece "FF22h" set in the polling request may correspond to information used by the external contactless communication device 12 for specifying the third digit and the forth digit of an application identification information piece as "2" and specifying the first digit and the second digit of the application identification information piece as any value for the external contactless communication device 12.

Therefore, it is only necessary for the command output unit 323 to select a combination of the application identification information piece "2222h" whose third digit and fourth digit are "2" and the corresponding secure element identification information piece "SE-2" as the one identification information piece. Subsequently, as illustrated in FIG. 16, it is only necessary for the command output unit 323 to transfer the polling request to the secure element 34-2 identified by the corresponding secure element information piece "SE-2" associated with the combination of the application identification information piece "2222h" and the secure element identification information piece "SE-22".

Alternatively, for example, as illustrated in FIG. 17, it is assumed that the application information piece set in the polling request is "33FFh". Here, in a way similar to the above example, "0" to "E" are values used by the external contactless communication device 12 for specifying a corresponding digit as a value from "0" to "E". In this situation, the application information piece "33FFh" set in the polling request may correspond to information used by the external contactless communication device 12 for specifying the first digit and the second digit of an application identification information piece as "3" and specifying the second digit to the fourth digit of the application identification information piece as any value for the external contactless communication device 12.

Therefore, it is only necessary for the command output unit 323 to select a combination of the application identification information piece "3333h" whose first digit and second digit are "3" and the corresponding secure element identification information piece "SE-31" as the one identification information piece. Subsequently, as illustrated in FIG. 17, it is only necessary for the command output unit 323 to transfer the polling request to the secure element 34-3 identified by the corresponding secure element information piece "SE-3" associated with the combination of the application identification information piece "3333h" and the secure element identification information piece "SE-31".

Figure 18:
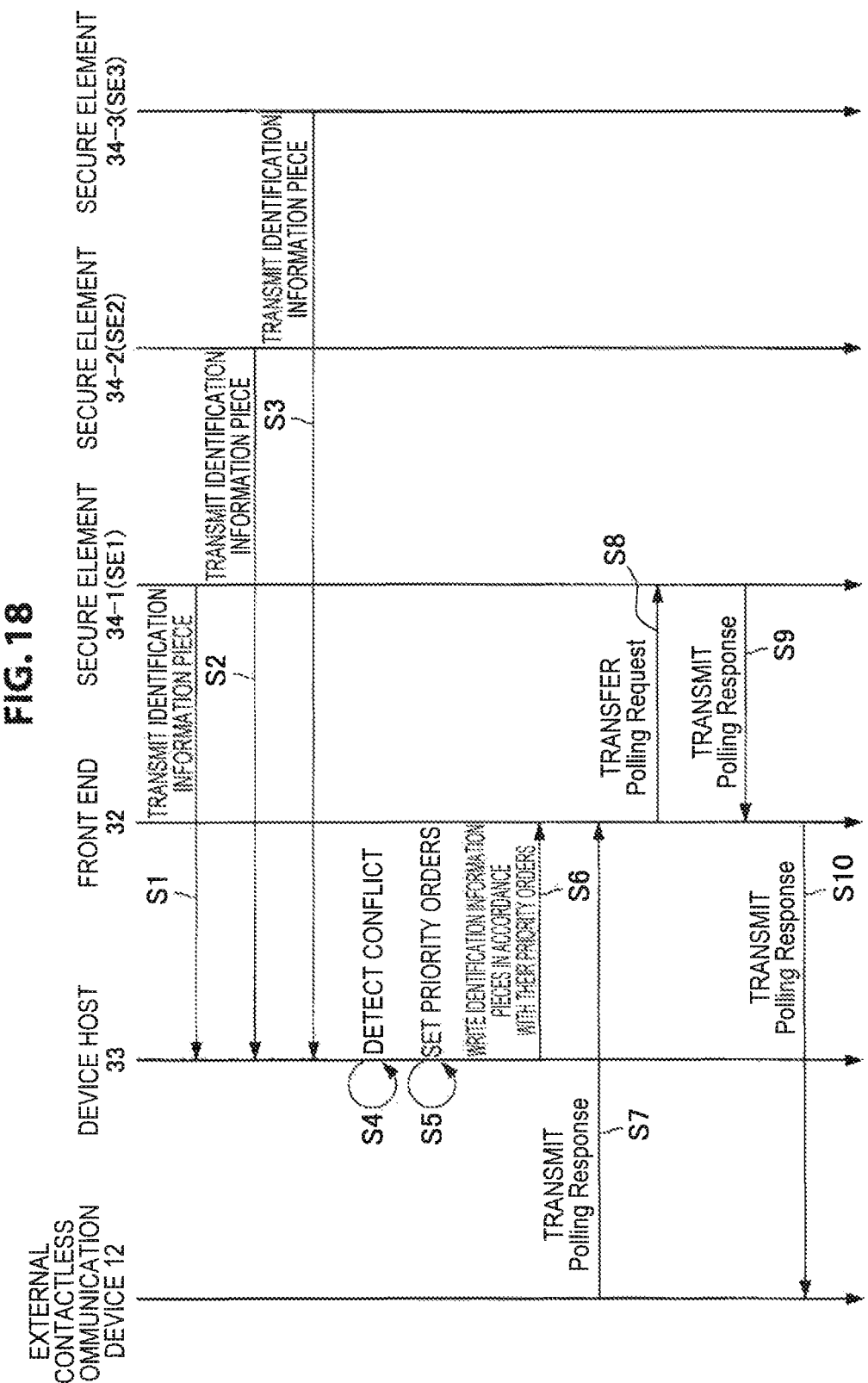
FIG. 18 is a sequence diagram illustrating an example of overall operation of a communication system.

In a case where an application identification information piece set in a polling request is information (such as "1111h") used by the external contactless communication device 12 for specifying the whole application identification information piece, it is only necessary for the command output unit 323 to select the identification information piece (such as "111h") the whole of which is specified by the external contactless communication device 12 in accordance with the application identification information piece set in the polling request, and a corresponding secure element identification information piece (such as "SE-1") as the one identification information piece 11. Workflow of Operation of Communication System Next, an example of overall operation of the communication system 1 will be described. FIG. 18 is a sequence diagram illustrating the example of overall operation of the communication system 1. As illustrated in FIG. 18, the secure element 34-1 transmits an identification information piece to the device host 33 (S1). In a similar way, the secure element 34-2 transmits an identification information piece to the device host 33 (S2). In addition, the secure element 34-3 transmits an identification information piece to the device host 33 (S3). The identification information acquisition unit 331 of the device host 33 acquires the transmitted identification information pieces.

Next, when conflict has been detected (S4), the priority order setting unit 332 of the device host 33 sets priority orders (S5), and the write process unit 333 writes the identification information pieces into the memory 41 of the front end 32 in accordance with their priority orders (S6). At this time, the storage control unit 321 of the front end 32 controls the memory 41 so that the identification information pieces are written into the memory 41. Subsequently, the external contactless communication device 12 transmits a polling request to the front end 32 (S7), the front end 32 receives the polling request, and the command input accepting unit 322 accepts input of the polling request.

Next, the command output unit 323 transfers the polling request to any one of the secure elements 34-1 to 34-3 on the basis of the write orders of the identification information pieces (S8). In the example illustrated in FIG. 18, the polling request is transferred to the secure element 34-1. Subsequently, the secure element 34-1 that has received the polling request transmits a polling response to the external contactless communication device 12 via the front end 32 (S9 and S10).

12. Workflow of Operation of Front End

Figure 19:
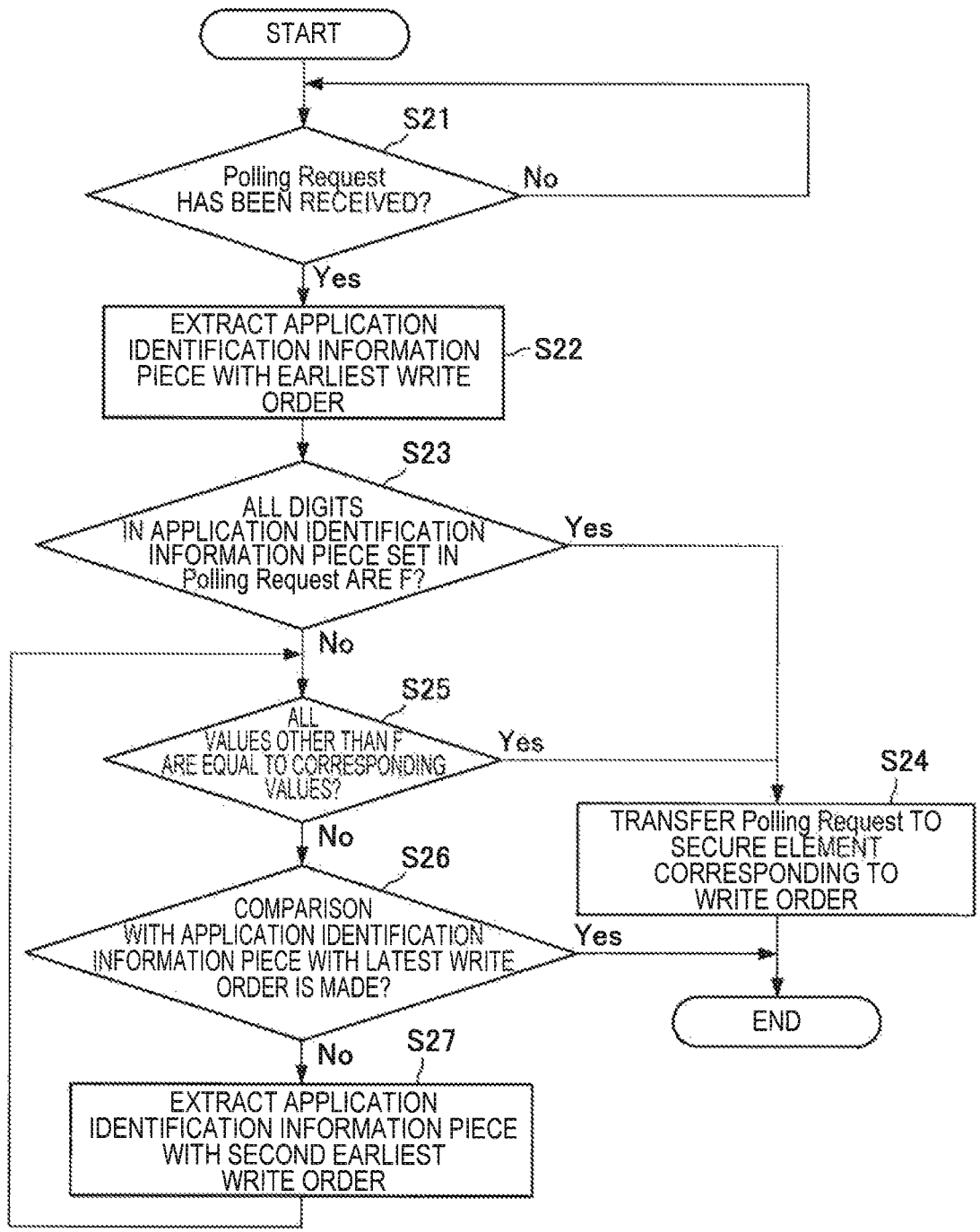
FIG. 19 is a flowchart illustrating an example of operation of a front end.

Next, an example of operation of the front end 32 will be described. FIG. 19 is a flowchart illustrating the example of operation of the front end 32. As illustrated in FIG. 19, the command output unit 323 returns to S21 in a case where the polling request has not been received (NO in S21). On the other hand, in a case where the polling request has been received (YES in S21), the command output unit 323 extracts an application identification information piece with the earliest write order (S22). Next, the command output unit 323 proceeds to S24 in a case where the application identification information piece set in the polling request is "FFFFh" (YES in S23). On the other hand, the command output unit 323 proceeds to S25 in a case where no application identification information piece set in the polling request is "FFFFh" (NO in S23).

Subsequently, the command output unit 323 proceeds to S24 in a case where all values other than "F" in the application identification information piece set in the polling request are equal to corresponding values in the extracted application identification information piece (YES in S25). On the other hand, the command output unit 323 proceeds to S26 in a case where some or all values other than "F" in the application identification information piece set in the polling request are not equal to corresponding values in the extracted application identification information piece (NO in S25). Next, the command output unit 323 ends its operation in a case where an application identification information piece with the latest write order is compared with the application identification information piece set in the polling request (YES in S26). On the other hand, in a case where the application identification information piece with the latest write order is not compared with the application identification information piece set in the polling request (NO in S26), the command output unit 323 extracts an application identification information piece with the second earliest write order (S27) and returns to S25.

Subsequently, in a case where the command output unit 323 proceeds to S24, the command output unit 323 transfers the polling request to a secure element 34 corresponding to the write order (S24) and ends its operation.

13. Conclusion

According to the embodiment of the present disclosure, there is provided the contactless communication device 11 including the plurality of secure elements 34 each of which includes the memory 43 configured to store an identification information piece, the device host 33 configured to acquire the identification information piece from each of the plurality of secure elements 34, and the front end 32 configured to communicate with the external contactless communication device 12. The device host 33 writes the respective identification information pieces acquired from the plurality of secure elements 34 into the front end 32. The front end 32 outputs a command received from the external contactless communication device 12 to one of the plurality of the secure elements 34 on the basis of write orders of the identification information pieces written by the device host 33 into the front end 32.

According to such a configuration, it is only necessary to return the identification information piece acquired from one of the plurality of secure elements 34. Therefore, according to the embodiment of the present disclosure, it is possible to make response speed of an identification information piece in response to a command that requests the identification information piece, faster than a case where the respective identification information pieces acquired from the plurality of the secure element 34 are returned. In addition, according to the embodiment of the present disclosure, a command output destination is decided on the basis of the write orders of the identification information pieces. Therefore, it is possible to easily decide the command output destination. It is also possible to decide the command output destination in view of the priority orders if the write orders are decided in accordance with the set priority orders.

For example, in a case where the command that requests the identification information piece is broadcasted to the plurality of the secure elements 34, the following situations occur. As one situation, although sometimes response time is prescribed in the command that requests the identification information piece, response time may exceed the prescribed time (load on front end 32 may increase) when the command is broadcasted to the plurality of secure elements 34.

As another situation, electric power consumption may increase because the plurality of secure elements 34 have to respond to the command. However, according to the embodiment of the present disclosure, the command that requests the identification information piece is not broadcasted to the plurality of secure element 34, but is output to one of the plurality of secure elements 34. Therefore, it is possible to avoid such situations.

In a case where the front end 32 directly collects the respective identification information pieces from the plurality of secure elements 34, a user has to reset the priority orders when conflict occurs. This requires a transaction between the front end 32 and the device host 33 (with which operation unit 53 and display unit 54 are connected). According to the embodiment of the present disclosure, the device host 33 directly collects the respective identification information pieces from the plurality of secure elements 34. Therefore, such a transaction is not necessary.

In addition, according to the embodiment of the present disclosure, it is only necessary for the front end 32 to transfer the command to one of the plurality of secure elements 34, and the front end 34 does not have to process the command. Therefore, easy implementation is achieved. Moreover, according to the embodiment of the present disclosure, each of the plurality of secure elements 34 does not have to be activated before transferring the command. Therefore, easy operation sequence is achieved.

In addition, in a case where the removable secure element 34 such as a uSD or a UICC is attached or detached, the attachment or detachment of the secure element 34 is considered to be transmitted to the front end 32 not directly and not in real time, but the attachment or detachment of the secure element 34 is considered to be transmitted to the device host 33 directly and in real time. Therefore, like the embodiment of the present disclosure, control based on the attachment or detachment of the secure element 34 is performed more easily in a case where the device host 33 collects the identification information pieces and writes the identification information pieces into the front end 32 than the case where the front end 32 directly collects the identification information pieces.

In a similar way, like host card emulation, in a case where an identification information piece is stored in the device host 33 from a server without passing through the front end 32, or in a case where identification information piece stored in the device host 33 is deleted from the server, such communication between the server and the device host 33 is not considered to be transmitted to the front end not directly and not in real time. Therefore, like the embodiment of the present disclosure, control based on the communication between the server and the device host 33 is performed more easily in the case where the device host 33 collects the identification information pieces and writes the identification information pieces into the front end 32 than the case where the front end 32 directly collects the identification information pieces.

Although a lot of identification information pieces may be stored in the device host 33 when using host card emulation, a lot of time is considered to be necessary for the front end 32 to acquire all the identification information pieces. In addition, in order to store the identification information pieces in the front end 32 even if only temporarily, many memories are necessary, and cost increases. Therefore, like the embodiment of the present disclosure, the case where the device host 33 collects the identification information pieces and writes the identification information pieces into the front end 32 is more cost effective than the case where the front end 32 directly collects the identification information pieces.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In the above described example, the device host 33 is independent of the other devices. However, the device host 33 does not have to be independent of the other devices. For example, the device host 33 may be incorporated in another device (such as secure element 34). In other words, the functions of the device host 33 may be incorporated in another device. Alternatively, the device host 33 does not have to be separated from another device, and may be integrated with the another device.

The series of processes described above can be not only carried out by hardware but also carried out by software. When the series of processes is to be carried out by software, a program constituting the software is installed from a program recording medium onto a computer incorporated in dedicated hardware or a general-purpose personal computer, for example, that can perform various kinds of functions by installing various kinds of programs thereon.

The program recording medium storing the program to be installed on the computer and set in a state of being executable by the computer may include a magnetic disk, an optical disk, and a magneto-optical disk. Alternatively, the program recording medium may include a removable media as packaged media including a semiconductor memory, or the like, or ROM, hard disk, or the like, which stores the program temporarily or permanently. The program is stored onto the program recording medium using a wire or wireless communication medium such as a local area network, the Internet, digital satellite broadcasting, or the like via an interface such as a router, a modem, or the like as the occasion demands.

In the present specification, the steps describing the program include not only processes performed in time series in the described order but also processes not necessarily performed in time series but performed in parallel or individually.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
An information processing system including:
a plurality of processing devices each of which includes a storage unit configured to store an identification information piece;
a management device configured to acquire the identification information piece from each of the plurality of the processing devices; and
a communication device configured to communicate with an external device, wherein
the management device writes the identification information piece acquired from each of the plurality of the processing devices into the communication device, and
the communication device outputs a command received from the external device to one of the plurality of the processing devices on the basis of write orders of the identification information pieces written into the communication device by the management device.

(2)
The information processing system according to (1), wherein
the communication device selects one identification information piece from the respective identification information pieces acquired from the plurality of the processing devices on the basis of the write orders, and outputs the command to the processing device including the storage unit in which the one identification information piece that has been selected is stored.

(3)
The information processing system according to (2), wherein
the communication device acquires predetermined information set in the command and selects the one identification information piece on the basis of the predetermined information and the write orders.

(4)
The information processing system according to (3), wherein
in a case where the predetermined information is information used by the external device for designating any identification information piece for the external device, the communication device selects an identification information piece with the earliest write order as the one identification information piece.

(5)
The information processing system according to (3), wherein
in a case where the predetermined information is information used by the external device for specifying a whole of the identification information piece, the communication device selects, as the one identification information piece, the identification information piece the whole of which is specified by the external device on the basis of the predetermined information.

(6)
The information processing system according to (3), wherein
in a case where the predetermined information is information used by the external device for specifying a part of the identification information piece and for specifying a part other than the part of the identification information piece as any information for the external device, the communication device selects an identification information piece with the earliest write order, as the one identification information piece, from among one or a plurality of identification information pieces each of which has the part specified by the external device on the basis of the predetermined information.

(7)

An information processing method including:

acquiring an identification information piece from each of a plurality of processing devices;

writing the identification information piece acquired from each of the plurality of the processing devices into a communication device; and outputting a command received from an external device to one of the plurality of the processing devices on the basis of write orders of the identification information pieces written into the communication device.

(8)

A management device including:

an identification information acquisition unit configured to acquire an identification information piece from each of a plurality of processing devices; and a write process unit configured to write the identification information piece acquired from each of the plurality of the processing devices into a communication device, wherein a command received by the communication device is output to one of the plurality of the processing devices on the basis of write orders of the identification information pieces written into the communication device.

(9)

A management method including:

acquiring an identification information piece from each of a plurality of processing devices; and writing the identification information piece acquired from each of the plurality of the processing devices into a communication device, wherein a command received by the communication device is output to one of the plurality of the processing devices on the basis of write orders of the identification information pieces written into the communication device.

(10)

A program for causing a computer to function as a management device, the management device including:

an identification information acquisition unit configured to acquire an identification information piece from each of a plurality of processing devices; and a write process unit configured to write the identification information piece acquired from each of the plurality of the processing devices into a communication device, wherein a command received by the communication device is output to one of the plurality of the processing devices on the basis of write orders of the identification information pieces written into the communication device.

(11)

A communication device including:

a storage control unit configured to control a storage unit in a manner that a management device writes an identification information piece acquired by the management device from each of a plurality of processing devices;

a command input accepting unit configured to accept input of a command; and a command output unit configured to output the command to one of the plurality of the processing devices on the basis of write orders of the identification information pieces written into the storage unit by the management device.

(12)

The communication device according to (11), wherein the command output unit selects one identification information piece from the respective identification information pieces acquired from the plurality of the processing devices on the basis of the write orders, and outputs the command to the processing device in which the one identification information piece that has been selected is stored.

(13)

The communication device according to (12), wherein the command output unit acquires predetermined information set in the command and selects the one identification information piece on the basis of the predetermined information and the write orders.

(14)

The communication device according to (13), wherein in a case where the predetermined information is information used for designating any identification information piece, the command output unit selects an identification information piece with the earliest write order as the one identification information piece.

(15)

The communication device according to (13), wherein in a case where the predetermined information is information for specifying a whole of the identification information piece, the command output unit selects, as the one identification information piece, the identification information the whole of which is specified on the basis of the predetermined information.

(16)

The communication device according to (13), wherein in a case where the predetermined information is information for specifying a part of the identification information piece and for specifying a part other than the part of the identification information piece as any information, the command output unit selects an identification information piece with the earliest write order, as the one identification information piece, from among one or a plurality of identification information pieces each of which has the part specified on the basis of the predetermined information.

(17)

A communication method including:

controlling a storage unit in a manner that a management device writes an identification information piece acquired by the management device from each of a plurality of processing devices;

accepting input of a command; and outputting the command to one of the plurality of the processing devices on the basis of write orders of the identification information pieces written into the storage unit by the management device.

(18)

A program for causing a computer to function as a communication device, the communication device including:

a storage control unit configured to control a storage unit in a manner that a management device writes an identification information piece acquired by the management device from each of a plurality of processing devices;

a command input accepting unit configured to accept input of a command; and a command output unit configured to output the command to one of the plurality of the processing devices on the basis of write orders of the identification information pieces written into the storage unit by the management device.

REFERENCE SIGNS LIST

1 communication system
11 contactless communication device (information processing device)

12 external contactless communication device (external device)
31 antenna
32 front end (communication device, communication unit)
34 secure element (processing device, processing unit)
33 device host (management device, management unit)
41 memory
42 memory
43 memory (storage unit)
53 operation unit
54 display unit
320 control unit
321 storage control unit
322 command input accepting unit
323 command output unit
324 input unit
325 output unit
330 control unit
331 identification information acquisition unit
332 priority order setting unit
333 process unit
334 input unit
335 output unit
91 acquisition unit
92 setting unit
93 execution unit

The invention claimed is:

1. A contactless communication device comprising:
a plurality of processing devices each of which includes a storage unit configured to store an identification information piece;
a management device configured to acquire the identification information piece from each of the plurality of the processing devices; and
a communication device configured to perform contactless communication with an external device via near-field communication, wherein
the management device writes the identification information piece acquired from each of the plurality of the processing devices into the communication device,
the communication device outputs a command received from the external device to one of the plurality of the processing devices on a basis of write orders of the identification information pieces written into the communication device by the management device,
the management device displays, on a screen that is displayed to a user by the contactless communication device, application names, of the identification information pieces, included in available applications ordered for display in a descending order of priority, and application names, of the identification information pieces, included in to be available applications without priority orders set thereto and not included in the available applications ordered for display in the descending order,
the management device displays, on the screen that is displayed to the user by the contactless communication device, an application setting screen for selecting whether to set a selected application name, selected from the application names included in the to be available application without priority orders set thereto, to be included in the available applications ordered for display in the descending order of priority and not included in the to be available applications without priority orders set thereto, and the contactless communication device includes therewithin the plurality of processing devices, the management device, and the communication device.

2. The contactless communication device according to claim 1, wherein
the communication device selects one identification information piece from the respective identification information pieces acquired from the plurality of the processing devices on a basis of the write orders, and outputs the command to the processing device including the storage unit in which the one identification information piece that has been selected is stored.

3. The contactless communication device according to claim 2, wherein
the communication device acquires predetermined information set in the command and selects the one identification information piece on a basis of the predetermined information and the write orders.

4. The contactless communication device according to claim 3, wherein
in a case where the predetermined information is information used by the external device for designating any identification information piece for the external device, the communication device selects an identification information piece with an earliest write order as the one identification information piece.

5. The contactless communication device according to claim 3, wherein
in a case where the predetermined information is information used by the external device for specifying a whole of the identification information piece, the communication device selects, as the one identification information piece, the identification information piece the whole of which is specified by the external device on a basis of the predetermined information.

6. The contactless communication device according to claim 3, wherein
in a case where the predetermined information is information used by the external device for specifying a part of the identification information piece and for specifying a part other than the part of the identification information piece as any information for the external device, the communication device selects an identification information piece with an earliest write order, as the one identification information piece, from among one or a plurality of identification information pieces each of which has the part specified by the external device on a basis of the predetermined information.

7. An information processing method performed by a contactless communication device that includes therewithin a plurality of processing devices, a management device, and a communication device, the method comprising:
acquiring, by the management device, an identification information piece from each of the plurality of processing devices;
writing, by the management device, the identification information piece acquired from each of the plurality of the processing devices into a communication device;
outputting a command, received by the communication device through contactless communication from an external device via near-field communication, to one of the plurality of the processing devices on a basis of write orders of the identification information pieces written into the communication device;
displaying, on a screen that is displayed to a user by the contactless communication device, application names, of the identification information pieces, included in available applications ordered for display in a descending order of priority, and application names, of the identification information pieces, included in to be available applications without priority orders set thereto and not included in the available applications ordered for display in the descending order; and displaying, on the screen that is displayed to the user by the contactless communication device, an application setting screen for selecting whether to set a selected application name, selected from the application names included in the to be available application without priority orders set thereto, to be included in the available applications ordered for display in the descending order of priority and not included in the to be available applications without priority orders set thereto.

8. A management device utilizing contactless communication and comprising:
an identification information acquisition unit configured to acquire an identification information piece from each of a plurality of processing devices;
a write process unit configured to write the identification information piece acquired from each of the plurality of the processing devices into a communication device; and
a display unit configured to
display, on a screen that is displayed to a user, application names, of the identification information pieces, included in available applications ordered for display in a descending order of priority, and application names, of the identification information pieces, included in to be available applications without priority orders set thereto and not included in the available applications ordered for display in the descending order, and
display, on the screen that is displayed to the user, an application setting screen for selecting whether to set a selected application name, selected from the application names included in the to be available application without priority orders set thereto, to be included in the available applications ordered for display in the descending order of priority and not included in the to be available applications without priority orders set thereto,
wherein a command received through contactless communication, by the communication device via near-field communication, is output to one of the plurality of the processing devices on a basis of write orders of the identification information pieces written into the communication device,
wherein the management device includes therewithin the plurality of processing devices, the identification information acquisition unit, and the write process unit, and
wherein the identification information acquisition unit, the write process unit, and the display unit are each implemented via at least one processor.

9. A management method performed by a management device utilizing contactless communication and including therewithin a plurality of processing devices, an identification information acquisition unit, a write process unit, and a display unit, the method comprising:
acquiring, by the identification information acquisition unit, an identification information piece from each of the plurality of processing devices;
writing, by the write process unit, the identification information piece acquired from each of the plurality of the processing devices into a communication device;

displaying, by a display unit onto a screen that is displayed to a user, application names, of the identification information pieces, included in available applications ordered for display in a descending order of priority, and application names, of the identification information pieces, included in to be available applications without priority orders set thereto and not included in the available applications ordered for display in the descending order; and displaying, by the display unit onto the screen that is displayed to the user, an application setting screen for selecting whether to set a selected application name, selected from the application names included in the to be available application without priority orders set thereto, to be included in the available applications ordered for display in the descending order of priority and not included in the to be available applications without priority orders set thereto, wherein a command received through contactless communication, by the communication device via near-field communication, is output to one of the plurality of the processing devices on a basis of write orders of the identification information pieces written into the communication device.

10. A non-transitory computer-readable medium having embodied thereon a program, which when executed by at least one processor of a contactless communication device that includes therewithin a plurality of processing devices, an identification information acquisition unit, a write process unit, and a display unit, causes the contactless communication device to execute a method, the method comprising:
acquiring, by the identification information acquisition unit, an identification information piece from each of the plurality of processing devices;
writing, by the write process unit, the identification information piece acquired from each of the plurality of the processing devices into a communication device; and
displaying, by the display unit onto a screen that is displayed to a user, application names, of the identification information pieces, included in available applications ordered for display in a descending order of priority, and application names, of the identification information pieces, included in to be available applications without priority orders set thereto and not included in the available applications ordered for display in the descending order; and
displaying, by the display unit onto the screen that is displayed to the user, an application setting screen for selecting whether to set a selected application name, selected from the application names included in the to be available application without priority orders set thereto, to be included in the available applications ordered for display in the descending order of priority and not included in the to be available applications without priority orders set thereto, wherein
a command received through contactless communication, by the communication device via near-field communication, is output to one of the plurality of the processing devices on a basis of write orders of the identification information pieces written into the communication device.

11. A contactless communication device comprising:
a storage control unit configured to control a storage unit in a manner that a management device writes an identification information piece acquired by the management device from each of a plurality of processing devices;

a command input accepting unit configured to accept input of a command through contactless communication via near-field communication; and a command output unit configured to output the command to one of the plurality of the processing devices on a basis of write orders of the identification information pieces written into the storage unit by the management device, wherein the contactless communication device includes therewithin the plurality of processing devices, the storage control unit, the command input accepting unit, and the command output unit, wherein the management device is configured to display, on a screen that is displayed to a user by the contactless communication device, application names, of the identification information pieces, included in available applications ordered for display in a descending order of priority, and application names, of the identification information pieces, included in to be available applications without priority orders set thereto and not included in the available applications ordered for display in the descending order, and displays, on the screen that is displayed to the user by the contactless communication device, an application setting screen for selecting whether to set a selected application name, selected from the application names included in the to be available application without priority orders set thereto, to be included in the available applications ordered for display in the descending order of priority and not included in the to be available applications without priority orders set thereto, and wherein the storage control unit, the command input accepting unit, and the command output unit are each implemented via at least one processor.

12. The contactless communication device according to claim 11, wherein the command output unit selects one identification information piece from the respective identification information pieces acquired from the plurality of the processing devices on a basis of the write orders, and outputs the command to the processing device in which the one identification information piece that has been selected is stored.

13. The contactless communication device according to claim 12, wherein the command output unit acquires predetermined information set in the command and selects the one identification information piece on a basis of the predetermined information and the write orders.

14. The contactless communication device according to claim 13, wherein in a case where the predetermined information is information used for designating any identification information piece, the command output unit selects an identification information piece with an earliest write order as the one identification information piece.

15. The contactless communication device according to claim 13, wherein in a case where the predetermined information is information for specifying a whole of the identification information piece, the command output unit selects, as the one identification information piece, the identification information piece the whole of which is specified on a basis of the predetermined information.

16. The contactless communication device according to claim 13, wherein in a case where the predetermined information is information for specifying a part of the identification information piece and for specifying a part other than the part of the identification information piece as any information, the command output unit selects an identification information piece with an earliest write order, as the one identification information piece, from among one or a plurality of identification information pieces each of which has the part specified on a basis of the predetermined information.

17. A communication method performed by a contactless communication device that includes therewithin a plurality of processing devices, a storage control unit, a command input accepting unit, and a command output unit, the method comprising:

controlling, by the storage control unit, a storage unit in a manner that a management device writes an identification information piece acquired by the management device from each of the plurality of processing devices;

accepting, by the command input accepting unit, input of a command through contactless communication via near-field communication; and outputting, by the command output unit, the command to one of the plurality of the processing devices on a basis of write orders of the identification information pieces written into the storage unit by the management device, wherein the management device is configured to display, on a screen that is displayed to a user by the contactless communication device, application names, of the identification information pieces, included in available applications ordered for display in a descending order of priority, and application names, of the identification information pieces, included in to be available applications without priority orders set thereto and not included in the available applications ordered for display in the descending order, and display, on the screen that is displayed to the user by the contactless communication device, an application setting screen for selecting whether to set a selected application name, selected from the application names included in the to be available application without priority orders set thereto, to be included in the available applications ordered for display in the descending order of priority and not included in the to be available applications without priority orders set thereto.

18. A non-transitory computer-readable medium having embodied thereon a program, which when executed by at least one processor of a contactless communication device that includes therewithin a plurality of processing devices, a storage control unit, a command input accepting unit, and a command output unit, causes the contactless communication device to execute a method, the method comprising:

controlling, by the storage control unit, a storage unit in a manner that a management device writes an identification information piece acquired by the management device from each of a plurality of processing devices;

accepting, by the command input accepting unit, input of a command through contactless communication via near-field communication; and outputting, by the command output unit, the command to one of the plurality of the processing devices on a basis of write orders of the identification information pieces written into the storage unit by the management device,
wherein the management device is configured to
    display, on a screen that is displayed to a user by the contactless communication device, application names, of the identification information pieces, included in available applications ordered for display in a descending order of priority, and application names, of the identification information pieces, included in to be available applications without priority orders set thereto and not included in the available applications ordered for display in the descending order, and
    display, on the screen that is displayed to the user by the contactless communication device, an application setting screen for selecting whether to set a selected application name, selected from the application names included in the to be available application without priority orders set thereto, to be included in the available applications ordered for display in the descending order of priority and not included in the to be available applications without priority orders set thereto, and
wherein the storage control unit, the command input accepting unit, and the command output unit are each implemented via at least one processor.

19. The contactless communication device according to claim 1, wherein the contactless communication device is an IC card or a mobile phone device.

20. The contactless communication device according to claim 1, wherein, in a case where the selected application name is of an identification information piece including an ID given for uniquely identifying an application and an application name included in the available applications ordered for display in the descending order of priority is of an identification piece also including the ID given for uniquely identifying the application, the management device is further configured to display, on the screen that is displayed to the user by the contactless communication device, conflict notification screen for notifying a conflict.

* * * * *